United States Patent
Sakamoto et al.

(10) Patent No.: US 10,803,307 B2
(45) Date of Patent: Oct. 13, 2020

(54) VEHICLE CONTROL APPARATUS, VEHICLE, VEHICLE CONTROL METHOD, AND STORAGE MEDIUM

(71) Applicant: HONDA MOTOR CO., LTD., Tokyo (JP)

(72) Inventors: Yosuke Sakamoto, Wako (JP); Masamitsu Tsuchiya, Wako (JP); Kazuma Ohara, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 102 days.

(21) Appl. No.: 16/035,824

(22) Filed: Jul. 16, 2018

(65) Prior Publication Data
US 2019/0065838 A1    Feb. 28, 2019

(30) Foreign Application Priority Data
Aug. 30, 2017    (JP) ................. 2017-166064

(51) Int. Cl.
*G06K 9/00* (2006.01)
*B60W 30/09* (2012.01)

(52) U.S. Cl.
CPC ......... *G06K 9/00369* (2013.01); *B60W 30/09* (2013.01); *G06K 9/00798* (2013.01);
(Continued)

(58) Field of Classification Search
CPC .... B60W 30/09; B60W 30/095; B60W 30/12; B60W 30/14; B60W 2420/403; B60W 2420/42; B62D 5/04; G06K 9/00362; G06K 9/00369; G06K 9/00798; G06K 9/00805; G06K 9/00825; G08G 1/165; G08G 1/166; B60R 2300/301; B60R 2300/8033; B60R 2300/8053
See application file for complete search history.

(56) References Cited

U.S. PATENT DOCUMENTS

2010/0106356 A1* 4/2010 Trepagnier ............ G01S 17/023
                                                                   701/25
2012/0194680 A1    8/2012 Ishii
(Continued)

FOREIGN PATENT DOCUMENTS

| JP | 2011-081736 A | 4/2011 |
| JP | 2012-093883 A | 5/2012 |
| JP | 2015-114126 A | 6/2015 |

OTHER PUBLICATIONS

Japanese Office Action (w/ partial English translation) issued for Japanese Patent Application No. 2017-166064 dated Mar. 22, 2019.

*Primary Examiner* — Mekonen T Bekele
(74) *Attorney, Agent, or Firm* — Thomas | Horstemeyer, LLP

(57) ABSTRACT

There is provided a vehicle control apparatus that controls automated driving of a vehicle. The apparatus includes an extraction unit configured to extract an object existing around the vehicle from a scene image representing a peripheral status of the vehicle, and a control unit configured to calculate a moving locus of the object and a moving locus of the vehicle for a predetermined time from time when the scene image is acquired, and generate a moving locus by correcting the moving locus of the object based on the moving locus of the vehicle.

14 Claims, 12 Drawing Sheets

(52) U.S. Cl.
CPC ..... *G06K 9/00805* (2013.01); *G06K 9/00825* (2013.01); *B60R 2300/301* (2013.01); *B60R 2300/8033* (2013.01); *B60R 2300/8053* (2013.01); *B60W 2420/403* (2013.01)

(56) References Cited

U.S. PATENT DOCUMENTS

| | | | |
|---|---|---|---|
| 2015/0224987 A1* | 8/2015 | Tachibana | G08G 1/166 701/1 |
| 2016/0272215 A1* | 9/2016 | Laine | G08G 1/165 |
| 2016/0325676 A1* | 11/2016 | Yamada | G08G 1/166 |
| 2017/0060130 A1* | 3/2017 | Kim | H04W 40/244 |
| 2017/0327035 A1* | 11/2017 | Keiser | B60Q 9/008 |
| 2018/0292834 A1* | 10/2018 | Kindo | B60W 50/14 |
| 2018/0357890 A1* | 12/2018 | Fowe | G08G 1/0141 |
| 2019/0244038 A1* | 8/2019 | Tsuchiya | G06K 9/00805 |
| 2019/0359205 A1* | 11/2019 | Xu | B60W 30/0953 |
| 2019/0391585 A1* | 12/2019 | Zhang | B60W 30/09 |
| 2020/0097744 A1* | 3/2020 | Nakamura | B60R 21/01538 |
| 2020/0133269 A1* | 4/2020 | Wang | G06K 9/6223 |
| 2020/0156631 A1* | 5/2020 | Lin | B60W 30/0956 |

\* cited by examiner

VEHICLE CONTROL APPARATUS, VEHICLE, VEHICLE CONTROL METHOD, AND STORAGE MEDIUM

BACKGROUND OF THE INVENTION

Field of the Invention

The present invention relates to a vehicle control apparatus, a vehicle, a vehicle control method, and a storage medium and, more particularly, to a vehicle control technique for controlling an automated driving car.

Description of the Related Art

Automated driving of a vehicle is implemented by recognizing the peripheral environment of the vehicle, determining, based on the recognition result, a moving locus along which the vehicle is to move, and performing steering control for causing the vehicle to travel in accordance with the moving locus. When determining the moving locus, the positions of a moving object and stationary object on a road or around the vehicle are specified while predicting the future position of the moving object, thereby determining, in accordance with the specifying and prediction results, a position at which the vehicle is to exist at each future time. For example, the moving locus of the vehicle is determined so that the vehicle exists at each time in a region where no object exists.

Japanese Patent Laid-Open No. 2011-081736 discloses an arrangement in which when detecting a pedestrian based on an image obtained by performing image capturing, a pedestrian outside a preset range is excluded from candidates.

However, in the arrangement disclosed in Japanese Patent Laid-Open No. 2011-081736, for example, since a moving object (object) existing at a long distance is excluded from prediction target candidates, if a control target vehicle takes a moving locus to get closer to the object with the lapse of time, it may be impossible to predict the motion of the object as a prediction target or obtain, based on the moving locus of the control target vehicle, the moving locus of the object whose predicted motion has been corrected.

SUMMARY OF THE INVENTION

The present invention has been made to solve at least the above problem, and provides a vehicle control technique capable of obtaining, based on the moving locus of a control target vehicle, the moving locus of an object whose predicted motion has been corrected.

According to one aspect of the present invention, there is provided a vehicle control apparatus that controls automated driving of a vehicle based on a generated moving locus, comprising: an extraction unit configured to extract an object existing around the vehicle from a scene image representing a peripheral status of the vehicle; and a control unit configured to calculate a moving locus of the object and a moving locus of the vehicle for a predetermined time from time when the scene image is acquired, and generate a moving locus by correcting the moving locus of the object based on the moving locus of the vehicle.

According to the present invention, it is possible to obtain, based on the moving locus of a control target vehicle, the moving locus of an object whose predicted motion has been corrected.

Further features of the present invention will become apparent from the following description of exemplary embodiments (with reference to the attached drawings).

DESCRIPTION OF THE EMBODIMENTS

Embodiments of the present invention will be described below with reference to the accompanying drawings. The constituent elements described in the embodiments are merely examples. The present invention is not limited by the following embodiments.

(Arrangement of Vehicle Control Apparatus)

Figure 1A:
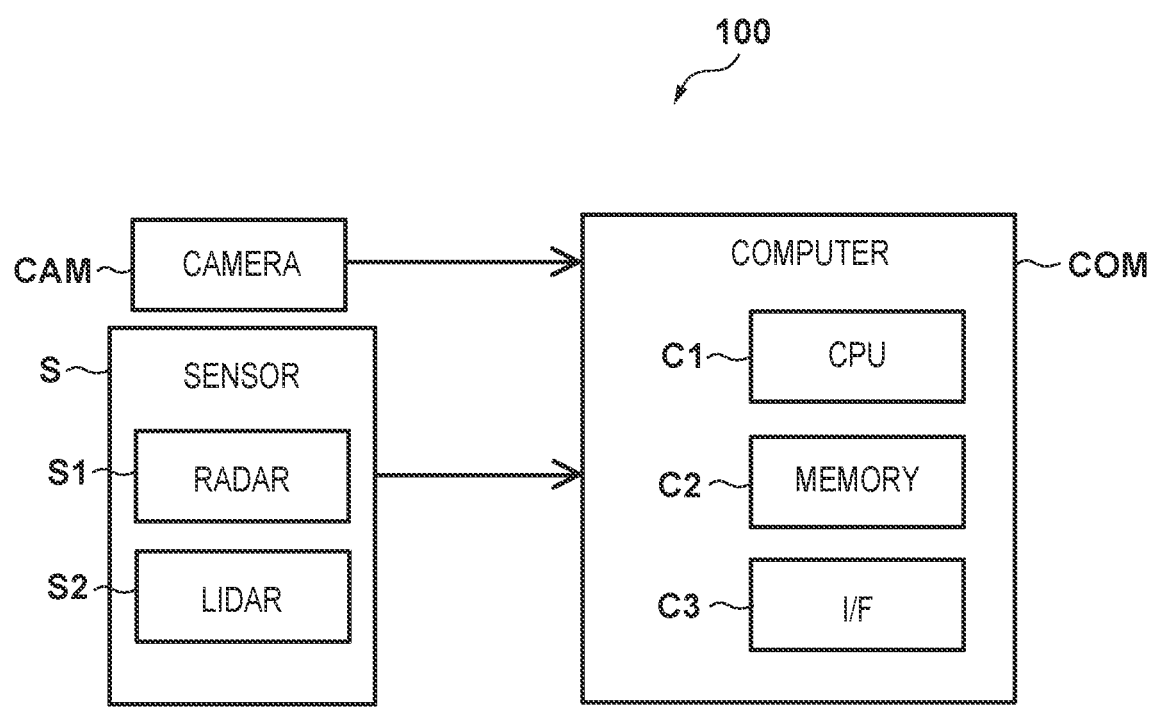
FIG. 1A is a block diagram showing the basic arrangement of a vehicle control apparatus.

FIG. 1A is a block diagram showing the basic arrangement of a vehicle control apparatus 100 that controls automated driving of a vehicle. The vehicle control apparatus 100 includes a sensor S, a camera CAM, and a computer COM. The sensor S includes, for example, a radar S1 and a lidar S2. The computer COM includes a CPU C1 that controls execution of processing, a memory C2, and an interface (I/F) C3 with an external device. The sensor S and the camera CAM acquire external information of the vehicle, and input it to the computer COM. A vehicle mounted with the computer COM will also be referred to as a self-vehicle hereinafter, and a two- or four-wheeled vehicle existing around the self-vehicle will also be referred to as another vehicle hereinafter.

The computer COM performs image processing for the information input from the sensor S and the camera CAM, thereby extracting objects included in an image (scene image) at given time when the external information is acquired. The objects include, for example, a static object (for example, a stationary object such as a road structure including a lane, traffic light, curb, traffic sign, or guardrail) that does not move with the lapse of time, and a dynamic object (for example, a moving object such as another vehicle or a pedestrian) that moves with the lapse of time.

For example, at given time T0, the computer COM extracts, from an image (scene image) acquired by the sensor S and the camera CAM, objects included in the scene image, and analyzes objects arranged around the self-vehicle (scene understanding processing).

The computer COM specifies the objects extracted from the scene image by labeling them, and performs, for each object, prediction calculation of the motion (moving locus) of the object for a predetermined time TS from given time to the future (prediction processing).

Based on the predicted moving locus of each object, the computer COM calculates the moving locus of the self-vehicle, indicating that the self-vehicle is to move to a specific position until specific time (action planning processing). When generating the moving locus of the self-vehicle, the computer COM can determine the moving locus of the self-vehicle in the acquired scene image in consideration of, for example, data of a combination of traveling by a skilled driver and the peripheral status of the self-vehicle, that is detected at this time. Practical processing contents will be described in detail later.

In this embodiment, the computer COM can control automated driving by switching among a plurality of automated driving modes. The plurality of automated driving modes include an automated driving mode (first automated driving mode) which gives priority to the calculation time and in which the action plan of the self-vehicle is calculated within a short time by performing the scene understanding, prediction, and action planning processes by one processing sequence (one sequence), an automated driving mode (second automated driving mode) which gives priority to the accuracy and in which the action plan of the self-vehicle is calculated at high accuracy by performing a loop operation of repeating the prediction and action planning processes at a predetermined operation period, and an automated driving mode (third automated driving mode) in which an action plan obtained in a scene image at given time T1 is calculated using an action plan obtained from a scene image at time T0 before time T1, thereby ensuring the accuracy of the action plan while reducing the processing load.

The automated driving mode can be switched in accordance with, for example, setting of a driver. Alternatively, the computer COM can control automated driving by automatically switching the automated driving mode in accordance with the external status surrounding the self-vehicle, such as the type of road (highway, ordinary road, or the like) on which the vehicle travels, information (for example, a few pedestrians and many other vehicles or many pedestrians and many other vehicles) of the objects extracted from the scene image, a time period, like the daytime or nighttime, during which the vehicle travels, and the weather.

If the vehicle control apparatus 100 shown in FIG. 1A is mounted on the vehicle, the computer COM may be arranged in an ECU of an image processing system or an ECU of a recognition processing system, that processes information of the sensor S and the camera CAM, an ECU in a control unit that controls driving of the vehicle, or an ECU for automated driving. Alternatively, as shown in FIG. 1B to be described below, functions may be distributed to the plurality of ECUs constituting the vehicle control apparatus 100, such as an ECU for the sensor S, an ECU for the camera, and an ECU for automated driving.

Figure 1B:
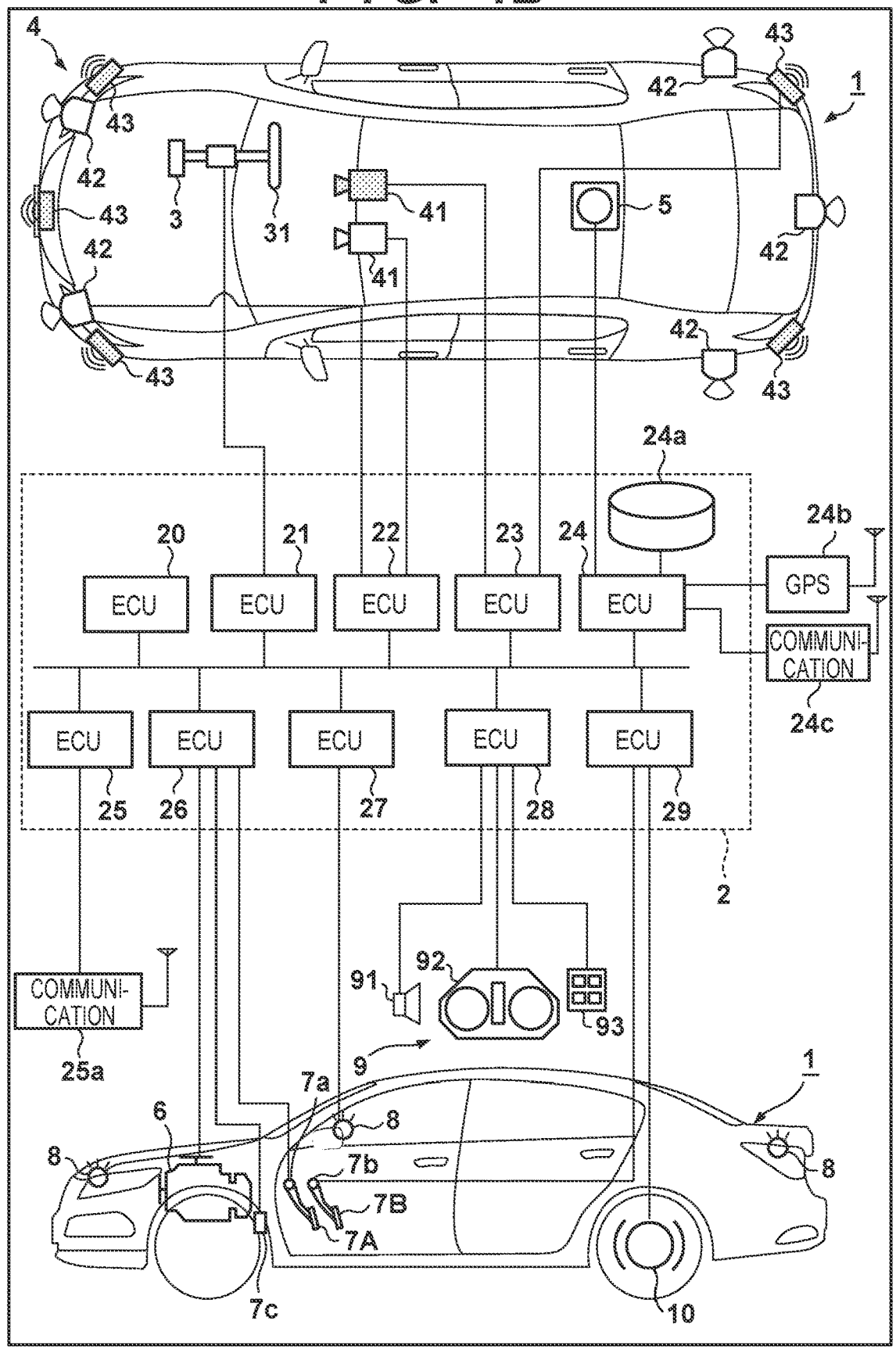
FIG. 1B is a view showing an example of the arrangement of control blocks for controlling a vehicle.

FIG. 1B is a view showing an example of the arrangement of the control blocks of the vehicle control apparatus 100 for controlling a vehicle 1. Referring to FIG. 1B, an outline of the vehicle 1 is shown in a plan view and a side view. As an example, the vehicle 1 is a sedan-type four-wheeled vehicle.

A control unit 2 shown in FIG. 1B controls each unit of the vehicle 1. The control unit 2 includes a plurality of ECUs 20 to 29 communicably connected by an in-vehicle network. Each ECU (Engine Control Unit) includes a processor represented by a CPU (Central Processing Unit), a storage device such as a semiconductor memory, and an interface with an external device. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed for the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. Processing for practical control associated with automated driving will be described in detail later.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the traveling direction of the vehicle 1.

The ECUs 22 and 23 perform control of detection units 41 to 43 that detect the peripheral status of the vehicle and information processing of detection results. The detection unit 41 is, for example, a camera (to be sometimes referred to as the camera 41 hereinafter) that captures the front side of the vehicle 1. In this embodiment, two cameras 41 are provided on the roof front of the vehicle 1. When images captured by the cameras 41 are analyzed (image processing), the contour of a target or a division line (a white line or the like) of a lane on a road can be extracted.

The detection unit 42 is, for example, a lidar (laser radar) (to be sometimes referred to as the lidar 42 hereinafter), and detects a target around the vehicle 1 or measures the distance to a target. In this embodiment, a plurality of lidars 42 are provided around the vehicle. In the example shown in FIG. 1B, five lidars 42 are provided; one at each corner of the front portion of the vehicle 1, one at the center of the rear portion, and one on each side of the rear portion. The detection unit 43 is, for example, a millimeter wave radar (to be sometimes referred to as the radar 43 hereinafter), and detects a target around the vehicle 1 or measures the distance to a target. In this embodiment, a plurality of radars 43 are provided around the vehicle. In the example shown in FIG. 1B, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle are provided, the reliability of detection results can be improved. In addition, since detection units of different types such as cameras, lidars, and radars are provided, the peripheral environment of the vehicle can be analyzed multilaterally. Note that the ECUs 22 and 23 may be integrated into one ECU.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The database 24a can be arranged on the network, and the communication device 24c can acquire the information by accessing the database 24a on the network.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1B, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged on, for example, the surface of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation and used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

(Outline of Processing in Automated Driving Control)

Figure 2A:
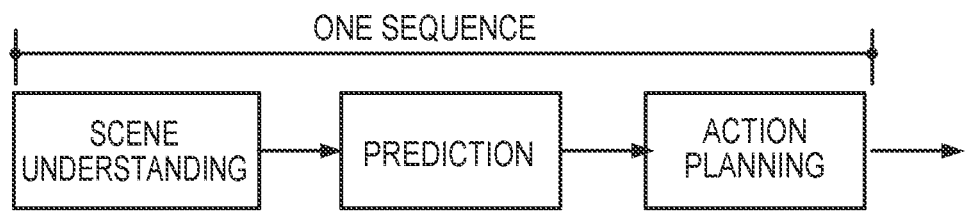
FIGS. 2A to 2C are views each showing an outline of processing in automated driving control.
Figure 2B:
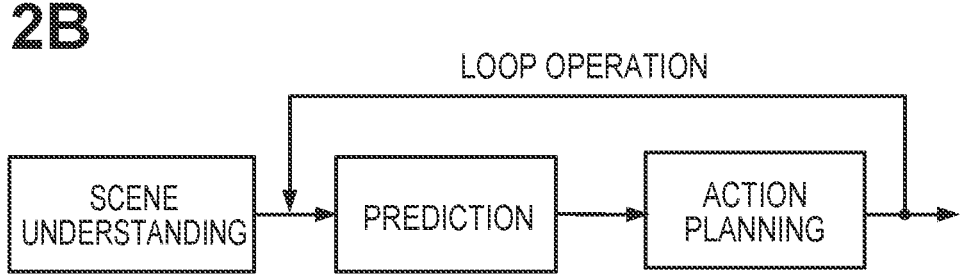
Figure 2C:
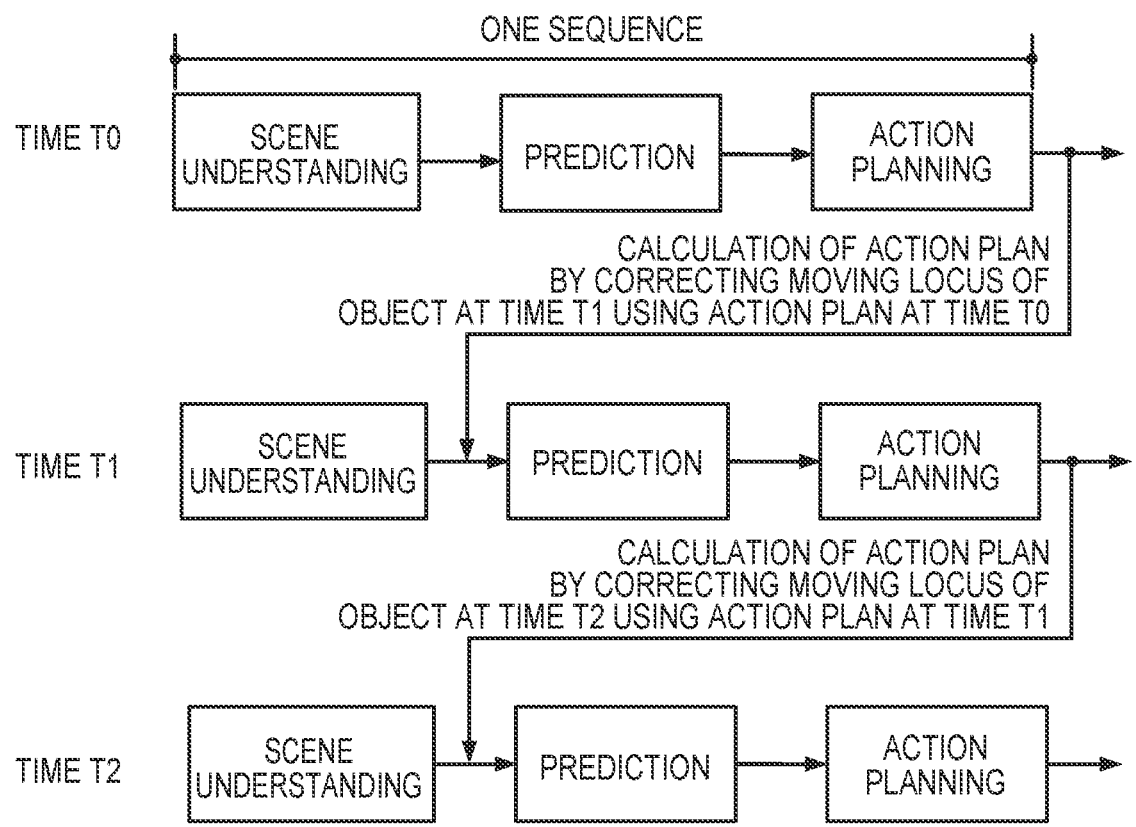

Automated driving control generally includes three steps, as shown in FIGS. 2A to 2C. That is, automated driving control includes, as the first step, scene understanding processing of recognizing external information of the periphery of the vehicle 1 (self-vehicle), as the second step, prediction processing of predicting a moving locus along which an object extracted from a scene image by the scene understanding processing, and as the third step, action planning processing of determining, based on the result of the prediction processing, a moving locus that should be taken by the vehicle 1 (self-vehicle).

In the following description, the first automated driving mode (FIG. 2A) which gives priority to the calculation time and in which the scene understanding, prediction, and action planning processes are performed by one sequence, the second automated driving mode (FIG. 2B) which gives priority to the accuracy and in which the action plan of the vehicle 1 (self-vehicle) is calculated at high accuracy by performing a loop operation of repeating the prediction and action planning processes among the scene understanding, prediction, and action planning processes at a predetermined operation period, and the third automated driving mode (FIG. 2C) in which an action plan obtained in a scene image at given time T1 is calculated using an action plan obtained in a scene image at time T0 before time T1 will be explained in detail below. Among the automated driving modes, the scene understanding processing is basically the same but the prediction and action planning processes have different characteristics.

First Embodiment: First Automated Driving Mode

In this embodiment, an ECU 20 executes control associated with automated driving of a vehicle 1. The ECU 20 controls automated driving of the vehicle 1 as a control target based on a calculated moving locus of the self-vehicle. FIG. 2A is a view showing an outline of a processing sequence corresponding to the first automated driving mode. In the first automated driving mode, the ECU 20 performs scene understanding, prediction, and action planning processes by one sequence. In the first automated driving mode, unlike the second automated driving mode (to be described later), no loop operation of repeating the prediction and action planning processes among the scene understanding, prediction, and action planning processes is performed. Therefore, as compared to the second automated driving mode, it is possible to reduce the calculation amount, and perform the processes from the scene understanding processing to the action planning processing within a shorter time.

Figure 3:
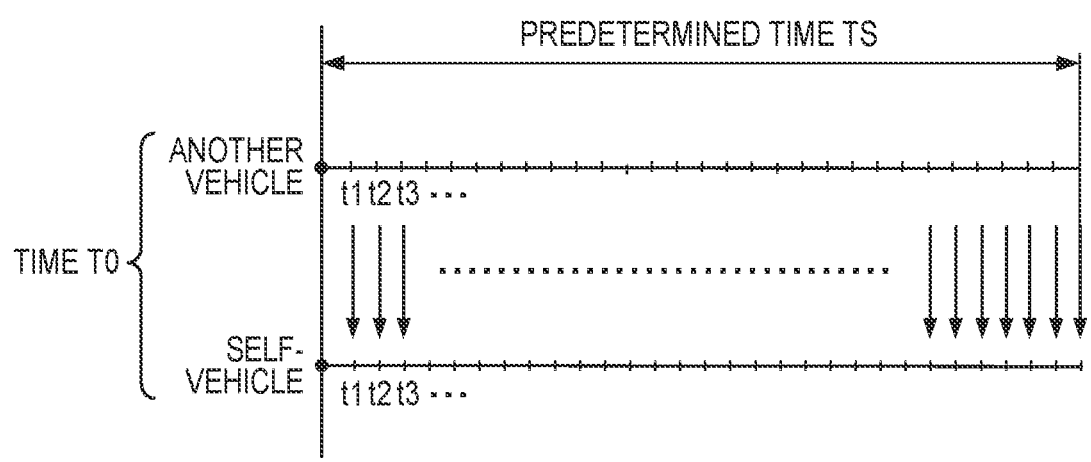
FIG. 3 is a view schematically showing the relationship between a time axis (ordinate) when a self-vehicle travels and a time axis (abscissa) used for calculation when obtaining a moving locus.

FIG. 3 is a view schematically showing the relationship between a time axis (ordinate) representing actual time when the vehicle 1 (self-vehicle) travels and a calculation time axis (abscissa) to be used for calculation when obtaining the moving locus of the dynamic object (for example, another vehicle 205 shown in FIG. 5) and that of the vehicle 1 (self-vehicle). For example, at time T0, based on information (external information) acquired by detection units (camera 41, lidar 42, and radar 43), pieces of information of a static object and dynamic object existing around the vehicle 1 (self-vehicle) are obtained as an image representing the peripheral status of the vehicle (a scene image representing one scene), as shown in, for example, FIG. 5.

In the first automated driving mode, the ECU 20 time-serially calculates the moving locus of an object for a predetermined time (TS: several sec, for example) from time (for example, time T0) when the scene image is acquired, and time-serially calculates the moving locus of the vehicle 1 (self-vehicle) based on the position of the moving locus of the object for each time.

For example, the ECU 20 predicts a moving locus along which a dynamic object such as a pedestrian or another vehicle that moves with the lapse of time moves for the predetermined time TS from time T0 when the scene image is acquired. The moving locus is predicted by time-serially predicting the position of the object for the predetermined time TS at each time t1, t2, t3, . . . obtained by dividing the predetermined time TS. Then, based on the moving locus of the object for the predetermined time, the ECU 20 time-serially calculates the moving locus of the vehicle 1 (self-vehicle) for the predetermined time TS at each time t1, t2, t3, . . . .

By the series of scene understanding, prediction, and action planning processes (processes of one sequence), a calculation result (prediction result) of the moving locus of the object and a calculation result (action plan) of the moving locus of the vehicle 1 (self-vehicle) based on the prediction result of the moving locus of the object are obtained. The predetermined time TS is an arbitrarily settable time, and a shorter predetermined time TS can be set.

Figure 4:
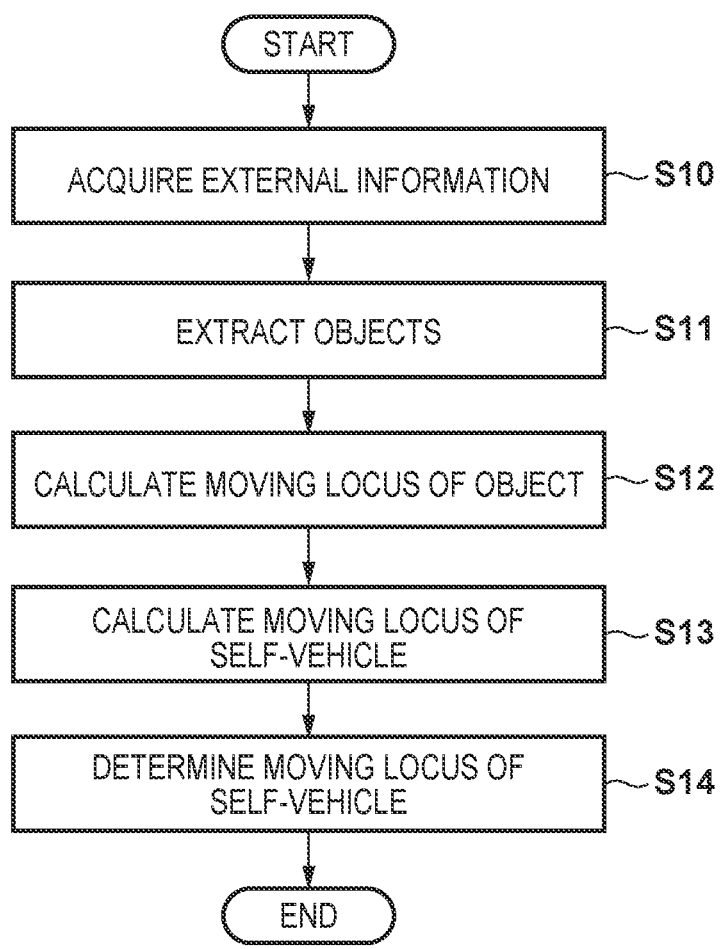
FIG. 4 is a flowchart for explaining the procedure of processing in the first automated driving mode.

FIG. 4 is a flowchart for explaining the procedure of processing in the first automated driving mode. When, for example, a driver instructs setting of a destination and automated driving, the ECU 20 automatically controls traveling of the vehicle 1 to the destination in accordance with a guidance route found by an ECU 24.

At the time of automated driving control, the ECU 20 acquires information (external information) concerning the peripheral status of the vehicle 1 from ECUs 22 and 23 (step S10). By performing the processing in step S10, an image (scene image) representing the peripheral status of the vehicle is acquired based on the external information at time T0, as shown in, for example, FIG. 5.

The ECU 20 extracts objects (a pedestrian 204, the other vehicle 205, and an obstacle 217) included in the scene image at time (for example, time T0) when the external information is acquired (step S11). The ECU 20 extracts, from the scene image, a static object (stationary object) that does not move with the lapse of time and a dynamic object (moving object) that moves with the lapse of time, and specifies the arrangement of the extracted objects in the scene image. The ECU 20 fixes the position of the vehicle 1 (self-vehicle) in the scene image as the origin of a coordinate system, specifying the positions of the objects.

With respect to the dynamic object (moving object) among the extracted objects, the ECU 20 time-serially calculates and predicts the motion (moving locus) of the object for the predetermined time TS from time T0, when the external information is acquired, toward the future (step S12). The ECU 20 time-serially predicts the position of the object for the predetermined time TS at each time t1, t2, t3, . . . obtained by dividing the predetermined time TS.

Based on the time-serially calculated moving locus of the dynamic object for the predetermined time, the ECU 20 time-serially calculates the moving locus of the vehicle 1 (self-vehicle) for the predetermined time (step S13). Based on the result of time-serially calculating the moving locus of the dynamic object in the scene image acquired at time T0, the ECU 20 calculates the time-series moving locus of the vehicle 1 (self-vehicle) in consideration of traveling data by a skilled driver and the positions of the objects existing around the vehicle 1 (self-vehicle) in the scene image. The ECU 20 time-serially calculates the position of the vehicle 1 (self-vehicle) for the predetermined time TS at each time t1, t2, t3, . . . obtained by dividing the predetermined time TS.

Based on the calculation result of the moving locus of the object at each time t1, t2, t3, . . . , the ECU 20 determines a moving locus along which the vehicle 1 (self-vehicle) should move at each time (step S14). Based on the operation result in step S13, the ECU 20 determines the moving locus of the vehicle 1 (self-vehicle). The above processing makes it possible to time-serially obtain the moving locus of the vehicle 1 (self-vehicle) corresponding to the time-series moving locus of the object.

Figure 5:
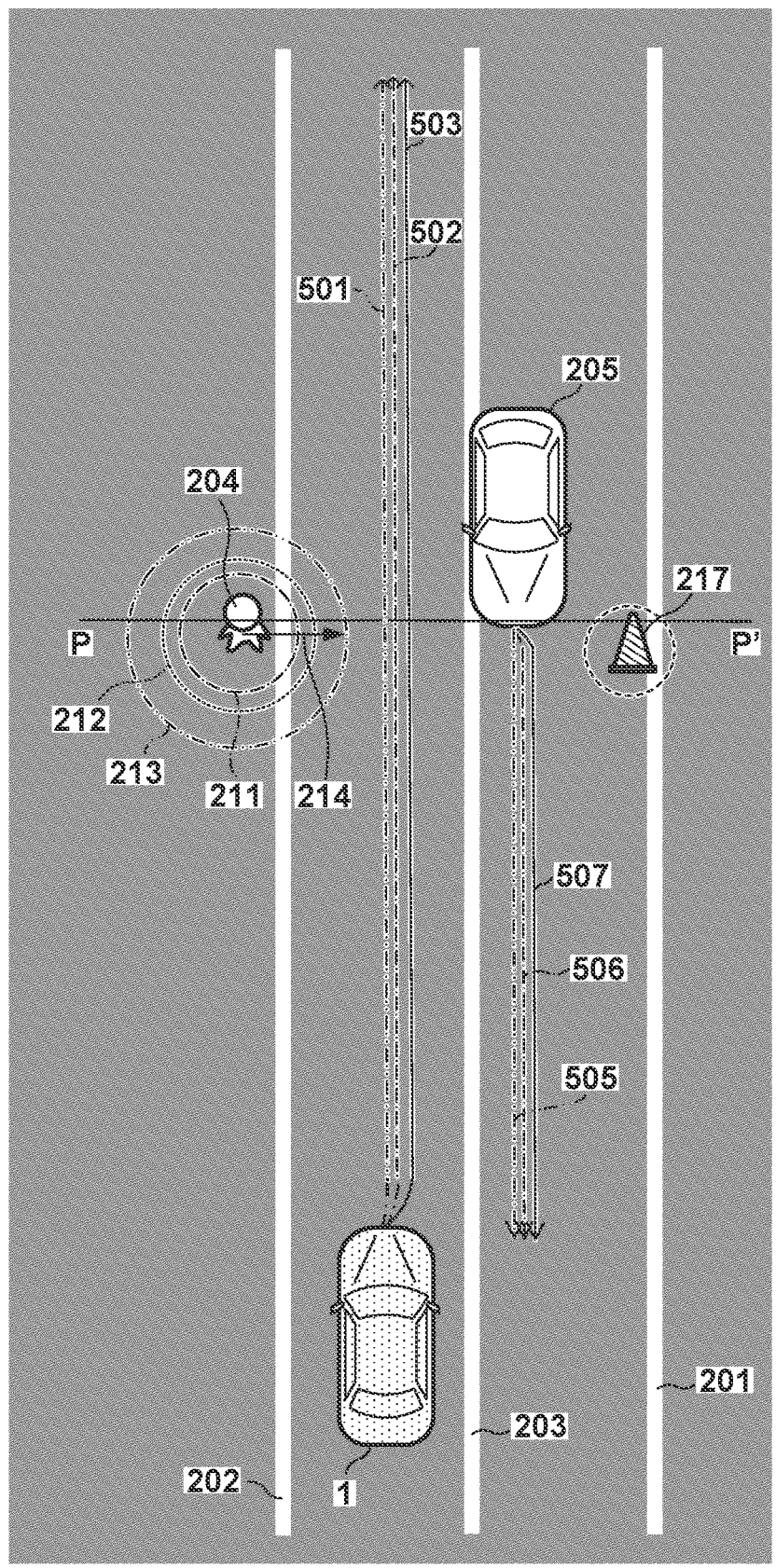
FIG. 5 is a view exemplifying a scene image acquired at given time.

Detailed contents of the processing in the first automated driving mode will be described next with reference to FIGS. 5 and 6A to 6C. FIG. 5 is a view exemplifying the scene image based on the external information acquired by the detection units (camera 41, lidar 42, and radar 43) at given time (for example, time t0). The pedestrian 204 and the other vehicle 205 are exemplified as objects existing around the vehicle 1 (self-vehicle) in the scene image.

(Practical Example of Scene Understanding)

When the processing shown in FIG. 4 starts, the ECUs 22 and 23 process the information concerning the peripheral status of the vehicle 1 (self-vehicle) based on the information acquired by the detection units (camera 41, lidar 42, and radar 43). The ECU 20 acquires the information (external information) concerning the peripheral status of the vehicle 1 (self-vehicle) from the ECUs 22 and 23. Based on the acquired external information, the ECU 20 acquires an image obtained when viewing the vehicle 1 and its peripheral status from above and representing the peripheral status of the vehicle (a scene image representing one scene), on which the objects around the vehicle 1 are mapped, as shown in, for example, FIG. 5. The above processing corresponds to step S10 of FIG. 4. The ECU 20 fixes the position of the vehicle 1 (self-vehicle) in the scene image as the origin of a coordinate system, executing the following operation processing.

The ECU 20 extracts the static object and dynamic object included in the scene image at time t0. Referring to FIG. 5, the vehicle 1 (self-vehicle) travels on the left lane (from the lower side to the upper side on the drawing of FIG. 5) divided by a center line 203 in a range where a vehicle can travel, that is indicated by division lines 201 and 202 (for example, outside lines and lines corresponding to shoulders). For example, a guardrail, curb, and the like (not shown) are extracted as stationary objects.

In the traveling direction of the vehicle 1 (self-vehicle), the existence of the pedestrian 204 on the side of a sidewalk located on the left side with respect to the division line 202 and the existence of the other vehicle 205 on the side of an opposite lane are extracted as dynamic objects. In addition, the existence of the obstacle 217 is extracted as a stationary object on the division line 201 on the side of the opposite lane.

Note that FIG. 5 shows examples of the other vehicle 205 and the pedestrian 204 as dynamic objects in the scene image at given time T0. However, the present invention is not limited to this. For example, another traffic participant such as a bicycle or two-wheeled vehicle can exist on the road or around the vehicle 1 (self-vehicle). It can be assumed that a plurality of other vehicles or a plurality of pedestrians exist. The above processing corresponds to step S11 of FIG. 4.

(Practical Example of Prediction Processing)

Upon acquiring the information (external information) concerning the peripheral status of the vehicle 1 from the ECUs 22 and 23, the ECU 20 predicts a moving locus of each of the objects (moving objects such as the pedestrian 204 and the other vehicle 205) based on the external information. FIG. 5 exemplifies the moving locus (211 to 213 or 505 to 507) obtained by predicting the motion of each object.

Referring to FIG. 5, a range within which the pedestrian 204 is predicted to exist in the future is represented by each of the one-dot dashed line 211, dotted line 212, and two-dot dashed line 213 surrounding the pedestrian 204. For example, the one-dot dashed line 211 indicates the predicted range of the pedestrian 204 at time t1. The range indicated by the dotted line 212 is a range within which the pedestrian 204 is predicted to exist at time t2 after time t1. Similarly, the range indicated by the two-dot dashed line 213 is a range within which the pedestrian 204 is predicted to exist at time t3 after time t2.

For prediction of the movement of the pedestrian, the direction of the face or that of the body is determined by a combination of parts such as eyes, nose, arms, and feet of the pedestrian 204. Since, in accordance with the direction of the face of the pedestrian 204, it is predicted that the pedestrian 204 is to move in the direction of the face, a predicted direction in which the pedestrian 204 is to move can be the direction of the face (for example, the direction of an arrow 214). In consideration of the direction of the face, the direction of the body, or the like of the pedestrian 204, the ECU 20 predicts the moving locus of the pedestrian 204 for the predetermined time TS at each time t1, t2, t3, . . . obtained by dividing the predetermined time TS.

Referring to FIG. 5, to avoid the obstacle 217, the other vehicle 205 travels in a state in which it is offset toward the center line 203. In consideration of the presence/absence of an obstacle and the status of the lane on which the other vehicle 205 travels, the ECU 20 predicts the moving locus of the other vehicle 205 for the predetermined time TS at each time t1, t2, t3, . . . obtained by dividing the predetermined time TS. The above processing corresponds to the processing in step S12 of FIG. 4. The moving locus 505 indicated by two-dot dashed line represents the moving locus of the other vehicle 205 obtained by the processing in this step.

(Practical Example of Action Planning)

As processing corresponding to step S13 of FIG. 4, the ECU 20 calculates, as the moving locus of the vehicle 1 (self-vehicle), the position of the vehicle 1 at each time t1, t2, t3, . . . based on the moving locus 505 of the object. Then, the ECU 20 determines, as the moving locus of the vehicle 1 (self-vehicle), the moving locus calculated in step S13 (step S14). Referring to FIG. 5, a moving locus 501 indicated by a two-dot dashed line exemplifies the moving locus of the vehicle 1 (self-vehicle) calculated by the processes in steps S13 and S14 of FIG. 4. In accordance with the determined moving locus 501, the ECU 20 instructs the ECUs 21, 26, and 29 to control steering, driving, and braking of the vehicle 1.

Figure 6A:
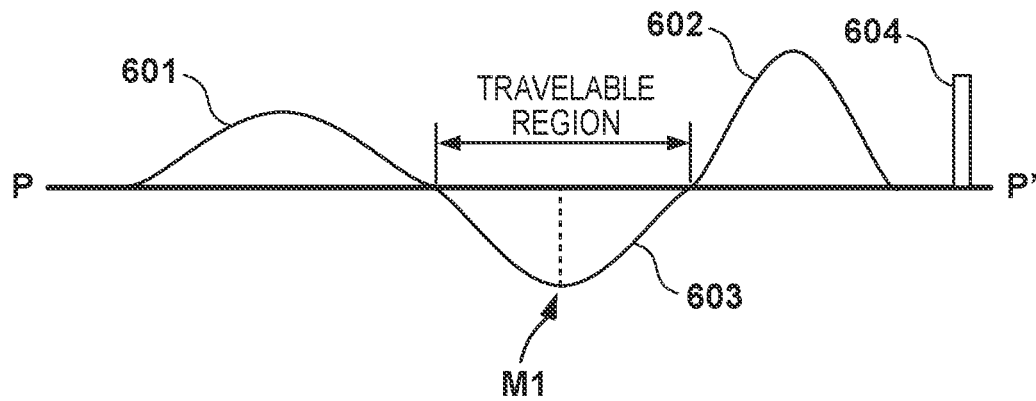
FIGS. 6A to 6C are views each for exemplarily explaining determination of the moving locus of the self-vehicle.
Figure 6B:
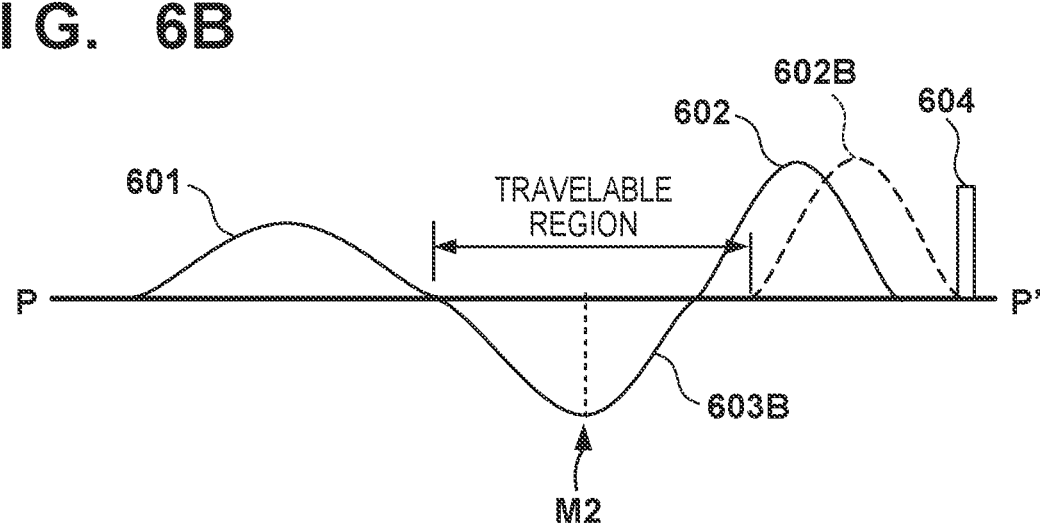
Figure 6C:
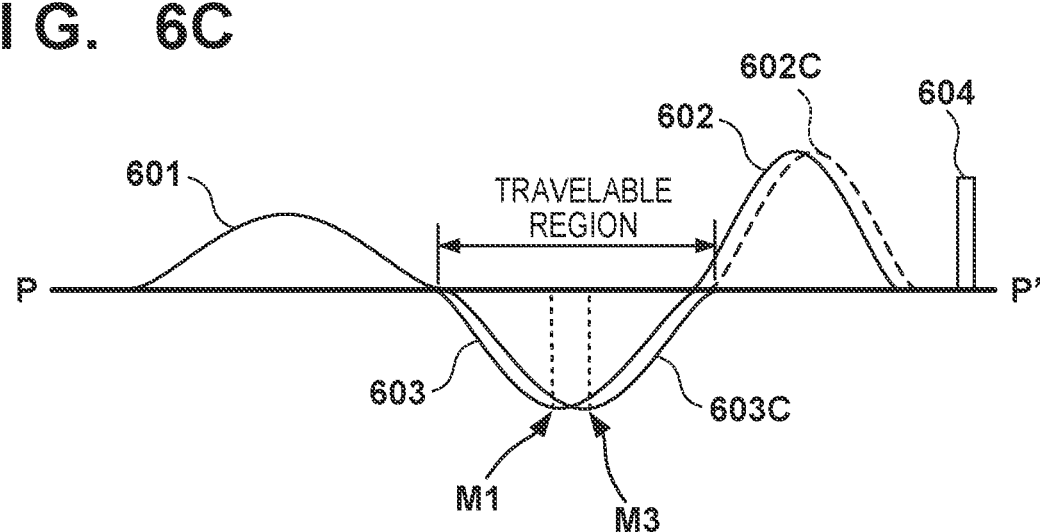

FIGS. 6A to 6C are views each for exemplarily explaining calculation and determination of the moving locus of the vehicle 1 (self-vehicle). Referring to FIG. 6A, each of curves 601 and 602 indicates the distribution of prediction values at which the object (the pedestrian 204 or the other vehicle 205) is predicted to exist at a predetermined position (a position between P and P' in FIG. 5) in the scene image. The curve 601 indicates the distribution of prediction values concerning the pedestrian 204 shown in FIG. 5. The curve 602 indicates the distribution of prediction values concerning the other vehicle 205 shown in FIG. 5.

A rectangle 604 indicates the distribution of prediction values concerning a stationary object such as a curb (not shown) or the obstacle 217 as the static object (stationary object). As for the static object (stationary object), the object remains at the position without moving, and thus the distribution of the prediction values is a rectangular distribution such that a large value is obtained at the position and zero or sufficiently small values are obtained at the remaining positions.

A region between the curves 601 and 602 is a region where no object exists on the lane on which the vehicle 1 (self-vehicle) travels, and a region where the vehicle 1 (self-vehicle) can travel. A curve 603 indicates the distribution of traveling patterns by the skilled driver in the travelable region. A peak M1 of the curve 603 indicates a traveling position that is selected by the skilled driver at the highest probability in the travelable region.

The ECU 20 specifies a region (travelable region) where no object exists at each time (for example, t1, t2, t3, . . . , TS) shown in FIG. 3, and calculates, based on the distribution of the traveling patterns by the skilled driver, a moving locus so as to move the vehicle 1 to the position of the peak M1 of the curve 603. The thus calculated moving locus is set as the moving locus 501 of the vehicle 1 (self-vehicle) obtained in steps S13 and S14 of FIG. 4.

Note that the "skilled driver" is, for example, a professional driver or an excellent driver who has no accidents or traffic violations. In addition, traveling data of vehicles by a number of drivers may be collected, and traveling data that satisfy a predetermined criterion such as a criterion that no sudden lane change, sudden start, sudden braking, or sudden steering is performed or a criterion that the traveling speed is stable may be extracted from the collected traveling data and reflected, as traveling data of a skilled driver, on automated driving control by the ECU 20.

In the first automated driving mode, the moving locus of the vehicle 1 (self-vehicle) is time-serially calculated in correspondence with the time-series moving locus of each object. This makes it possible to time-serially determine the moving locus of the vehicle 1 (self-vehicle) so the vehicle 1 does not interfere with the objects (the pedestrian 204 and the other vehicle 205) included in the scene image.

Second Embodiment: Second Automated Driving Mode

In this embodiment, an ECU 20 executes control associated with automated driving of a vehicle 1. The ECU 20 controls automated driving of the vehicle 1 as a control target based on a calculated moving locus. FIG. 2B is a view showing an outline of a processing sequence corresponding to the second automated driving mode. In the second automated driving mode, the ECU 20 performs a loop operation of repeating prediction and action planning processes among scene understanding, prediction, and action planning processes at a predetermined operation period, calculating the action plan of the vehicle 1 (self-vehicle) at higher accuracy.

Figure 7:
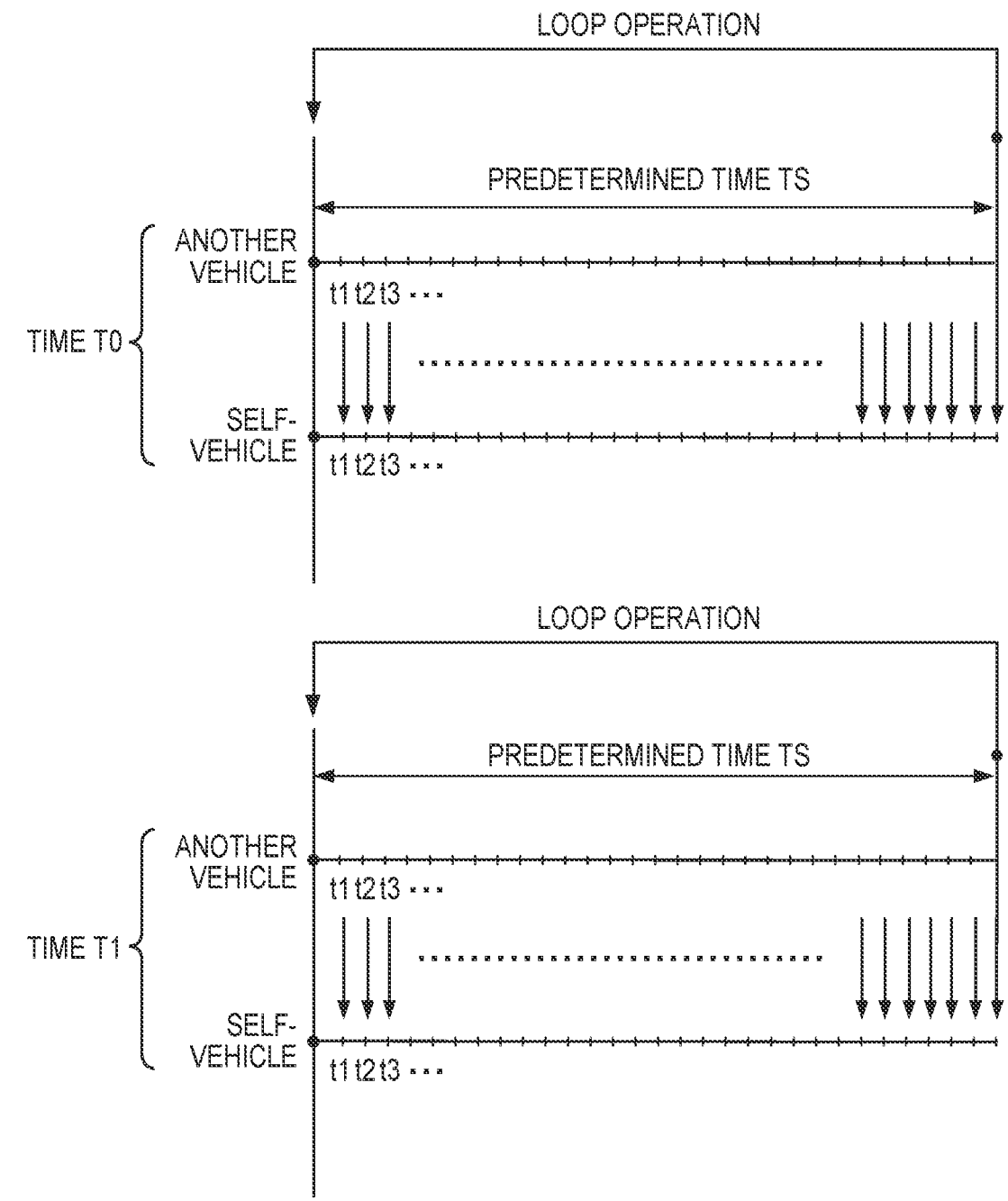
FIG. 7 is a view schematically showing the relationship between a time axis (ordinate) when a self-vehicle travels and a time axis (abscissa) used for calculation when obtaining a moving locus.

FIG. 7 is a view schematically showing the relationship between a time axis (ordinate) representing actual time when the vehicle 1 (self-vehicle) travels and a calculation time axis (abscissa) to be used for calculation when obtaining the moving locus of the dynamic object (for example, another vehicle 205 shown in FIG. 5) and that of the vehicle 1 (self-vehicle). For example, at time T0, based on information (external information) acquired by detection units (camera 41, lidar 42, and radar 43), pieces of information of a static object and dynamic object existing around the vehicle 1 (self-vehicle) are obtained as an image representing the peripheral status of the vehicle (a scene image representing one scene), as shown in, for example, FIG. 5 explained in the first embodiment.

In the second automated driving mode, the ECU 20 time-serially predicts the moving locus of the object for a predetermined time TS from time (for example, time T0) when the scene image is acquired. The moving locus is predicted by predicting the position of the object for the predetermined time TS at each time t1, t2, t3, . . . obtained by dividing the predetermined time TS.

The ECU 20 time-serially calculates the moving locus of the vehicle 1 (self-vehicle) for the predetermined time TS at each time t1, t2, t3, . . . based on the moving locus of the object for the predetermined time. By a series of scene understanding, prediction, and action planning processes, the calculation result of the moving locus of the vehicle 1 (self-vehicle) based on the calculation result of the moving locus of the object and the prediction result of the moving locus of the object is obtained. The predetermined time TS is an arbitrarily settable time, and a shorter predetermined time TS can be set.

By performing a loop operation, the ECU 20 predicts the motion of the object if the vehicle 1 (self-vehicle) moves in accordance with the calculated moving locus. The moving locus of the object is predicted by predicting the position of the object for the predetermined time TS at each time t1, t2, t3, . . . obtained by dividing the predetermined time TS.

The ECU 20 compares the predicted moving locus of the object with the moving locus of the object obtained by the last prediction processing. If, as a result of the comparison processing, the moving locus of the object has changed, the ECU 20 recalculates (corrects) the moving locus of the vehicle 1 (self-vehicle) for the predetermined time TS at time t1, t2, t3, . . . based on the changed moving locus of the object.

If the same processes are performed a predetermined number of times by the loop operation, and the moving locus of the object remains unchanged, that is, a change in moving locus of the object has converged, the ECU 20 determines the moving locus of the vehicle 1 (self-vehicle) based on the converged moving locus of the object.

If the change in moving locus has not converged even after the loop operation is performed the predetermined number of times, the ECU 20 recalculates (corrects) the moving locus of the vehicle 1 (self-vehicle) for the predetermined time TS at each time t1, t2, t3, . . . based on the last corrected moving locus of the object, and then determines the moving locus of the vehicle 1 (self-vehicle). Note that the above processing has been described for explaining the operation associated with the scene understanding, prediction, and action planning processes in the scene image at time T0. The same applies to a case at time T1 after time T0 or a case at time T2 after time T1.

Figure 8:
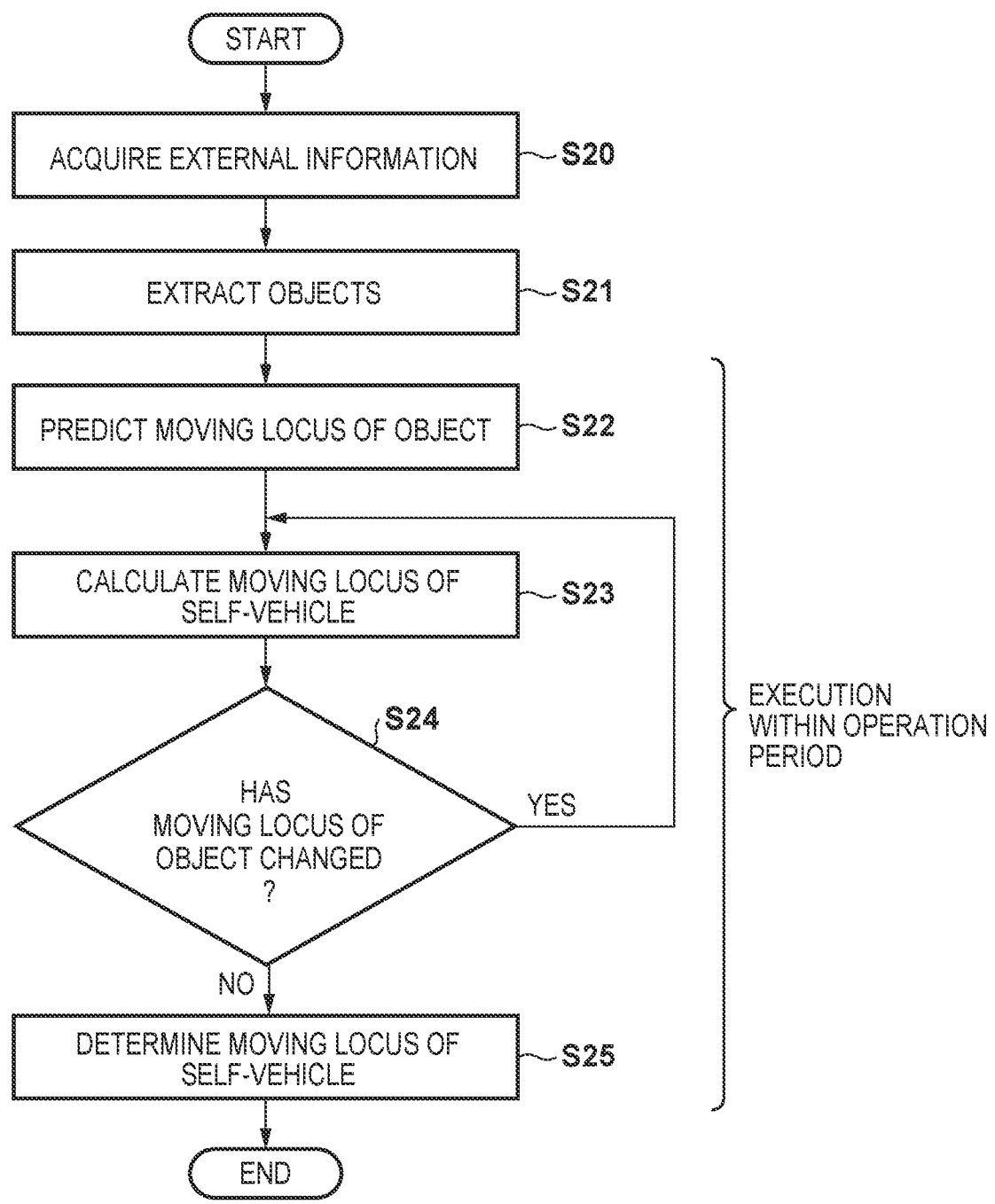
FIG. 8 is a flowchart for explaining the procedure of processing in the second automated driving mode.

FIG. 8 is a flowchart for explaining the procedure of processing in the second automated driving mode. When, for example, a driver instructs setting of a destination and automated driving, the ECU 20 automatically controls traveling of the vehicle 1 to the destination in accordance with a guidance route found by an ECU 24.

At the time of automated driving control, the ECU 20 acquires information (external information) concerning the peripheral status of the vehicle 1 from ECUs 22 and 23 (step S20). By performing the processing in step S20, an image (scene image) representing the peripheral status of the vehicle is acquired based on the external information at time T0, as shown in FIG. 5 explained in the first embodiment.

The ECU 20 extracts objects (a pedestrian 204, the other vehicle 205, and an obstacle 217) included in the scene image at time (for example, time T0) when the external information is acquired (step S21). The ECU 20 extracts, from the scene image, a static object (stationary object) and a dynamic object (moving object), and specifies the arrangement of the extracted objects in the scene image. The ECU 20 fixes the position of the vehicle 1 (self-vehicle) in the scene image as the origin of a coordinate system, specifying the positions of the objects.

With respect to the dynamic object (moving object) among the extracted objects, the ECU 20 predicts the motion (moving locus) of the object for the predetermined time TS from time to, when the external information is acquired, toward the future (step S22). The ECU 20 time-serially predicts the position of the object for the predetermined time TS at time t1, t2, t3, . . . obtained by dividing the predetermined time TS.

Based on the time-serially calculated moving locus of the object for the predetermined time, the ECU 20 calculates the moving locus of the vehicle 1 (self-vehicle) for the predetermined time (step S23). Based on the prediction result of the moving locus of the object in the scene image acquired at time T0, the ECU 20 calculates the time-series moving locus of the vehicle 1 (self-vehicle) in consideration of traveling data by a skilled driver and the positions of the objects existing around the vehicle 1 (self-vehicle) in the scene image. The ECU 20 time-serially calculates the position of the vehicle 1 (self-vehicle) for the predetermined time TS at each time t1, t2, t3, . . . .

In step S24, if the vehicle 1 (self-vehicle) moves in accordance with the moving locus calculated in step S23, the ECU 20 predicts the motion of the object. The ECU 20 compares the moving locus of the object predicted in this step with the moving locus of the object predicted in step S22 (the moving locus of the object obtained by the last prediction processing). The motion of the vehicle 1 (self-vehicle) may influence the motion of the object, and the ECU 20 determines whether the motion of the object (the moving locus of the object) changes by receiving the influence of the motion (the moving locus of the self-vehicle) of the vehicle 1 (self-vehicle) for the predetermined time (step S24). Based on comparison with a threshold, the ECU 20 determines whether a change in corrected moving locus of the object has converged by performing the repetitive operation in the predetermined operation period. The predetermined threshold is an arbitrarily settable value.

If it is determined in step S24 that a difference in moving locus of the object exceeds the predetermined threshold, the ECU 20 determines that the moving locus of the object has changed (YES in step S24), and returns the process to step S23.

In step S23, the ECU 20 recalculates (corrects) the moving locus of the vehicle 1 (self-vehicle) based on the changed moving locus of the object. That is, if the moving locus of the object has changed, the ECU 20 recalculates (corrects) the moving locus of the vehicle 1 (self-vehicle) for the predetermined time TS at each time t1, t2, t3, . . . based on the changed moving locus of the object, and advances the process to step S24.

In step S24, if the vehicle 1 (self-vehicle) moves in accordance with the moving locus corrected in step S23, the ECU 20 predicts again the motion of the object. Then, the ECU 20 compares the moving locus of the object predicted again with the moving locus of the object obtained by the last prediction processing. If, as a result of the comparison processing, the difference in moving locus of the object exceeds the predetermined threshold, the ECU 20 determines that the moving locus of the object has changed (YES in step S24), and returns the process to step S23. In step S23, the ECU 20 time-serially recalculates (corrects) the moving locus of the vehicle 1 (self-vehicle) for the predetermined time TS at each time t1, t2, t3, . . . . The ECU 20 repeats the same loop operation a preset number of times.

On the other hand, if, as a result of the comparison processing in step S24, there is no difference in moving locus of the object (the moving locus remains the same) or the difference in moving locus of the object is equal to or smaller than the predetermined threshold, the ECU 20 determines that the moving locus of the object remains unchanged (NO in step S24), and advances the process to step S25.

In step S25, the ECU 20 determines the moving locus along which the vehicle 1 (self-vehicle) moves for the predetermined time. If, based on the determination processing in step S24, the change in corrected moving locus of the object has converged (NO in step S24), the ECU 20 determines the moving locus of the vehicle 1 (self-vehicle) based on the converged moving locus of the object (step S25).

Note that if the ECU 20 counts up the number of times of execution of the loop operation in steps S23 and S24, and the change in moving locus does not converge even after the loop operation is performed the predetermined number of times (YES in step S24), that is, the moving locus of the object has changed to exceed the predetermined threshold, the ECU 20 advances the process to step S25 without returning the process to step S23.

If, based on the result of the comparison processing in step S24, the change in corrected moving locus of the object does not converge even after the loop operation is performed the predetermined number of times (YES in step S24), the ECU 20 determines the moving locus of the vehicle 1 (self-vehicle) based on the last corrected moving locus of the object (step S25).

Detailed contents of the processing in the second automated driving mode will be described next with reference to FIGS. 5 and 6A to 6C. In the second automated driving mode as well, an image (scene image) representing the peripheral status of the vehicle is acquired, as shown in FIG. 5 explained in the first embodiment. For example, at time T0, a scene image of objects existing around the traveling vehicle 1 (self-vehicle), that has been acquired by the detection units (camera 41, lidar 42, and radar 43), is acquired. Then, the ECU 20 extracts objects (the pedestrian 204, the other vehicle 205, and the obstacle 217) included in the scene image by the scene understanding processing, fixes the position of the vehicle 1 (self-vehicle) in the scene image as the origin of a coordinate system, and thus specifies the positions of the objects. By performing the series of scene understanding, prediction, and action planning processes by one sequence, similarly to the processes explained in the first embodiment, it is possible to obtain a moving locus 505 of the other vehicle 205 and a moving locus 501 of the vehicle 1 (self-vehicle), as shown in FIG. 5.

In the second automated driving mode, if the vehicle 1 (self-vehicle) moves in accordance with the calculated moving locus 501, the ECU 20 predicts the motion of each object by performing a loop operation. The moving locus of the object is predicted by predicting the position of the object for the predetermined time TS at each time t1, t2, t3, . . . obtained by dividing the predetermined time TS.

If the vehicle 1 (self-vehicle) selects the moving locus 501 closer to a center line 203 by avoiding the pedestrian 204, the other vehicle 205 shifts (corrects) the moving locus toward a division line 201 (toward the obstacle 217 to which the other vehicle 205 has a sufficient distance) to avoid interference with the vehicle 1 (self-vehicle).

For example, if the moving locus 505 of the other vehicle 205 changes, by the loop operation, to a moving locus 506 indicated by a one-dot dashed line when the vehicle 1 (self-vehicle) moves along the moving locus 501, the ECU 20 recalculates (corrects) the moving locus of the vehicle 1 (self-vehicle) for the predetermined time TS at each time t1, t2, t3, . . . based on the changed moving locus 506 of the other vehicle 205. For example, by re-executing the calculation processing, the ECU 20 corrects the moving locus 501 to a moving locus 502 indicated by a one-dot dashed line.

Similarly, if the moving locus 506 of the other vehicle 205 changes, by the loop operation, to a moving locus 507 indicated by a solid line when the vehicle 1 (self-vehicle) moves along the moving locus 502, the ECU 20 recalculates (corrects) the moving locus of the vehicle 1 (self-vehicle) for the predetermined time TS at each time t1, t2, t3, . . . based on the changed moving locus 507 of the other vehicle 205. For example, by re-executing the calculation processing, the ECU 20 corrects the moving locus 502 to a moving locus 503 indicated by a solid line. This processing corresponds to YES in step S24 of FIG. 8 and the processing in step S23.

If the moving locus 507 of the object (the other vehicle 205) remains unchanged by the loop operation, the ECU 20 determines that the change in moving locus of the other vehicle 205 has converged, and determines the moving locus 503 shown in FIG. 5 as the moving locus of the vehicle 1 (self-vehicle) based on the converged moving locus 507 of the other vehicle 205. These processes correspond to NO in step S24 of FIG. 8 and the processing in step S25.

Furthermore, if the same processes are performed the predetermined number of times by the loop operation, and the change in moving locus does not converge even after the loop operation is performed the predetermined number of times, the ECU 20 determines the moving locus of the vehicle 1 (self-vehicle) based on the last corrected moving locus of the object. These processes correspond to the processing (YES in step S24 of FIG. 7 and step S25) executed when the change in moving locus does not converge even after the loop operation is performed the predetermined number of times.

FIGS. 6A to 6C are views each exemplarily showing determination of the moving locus of the self-vehicle. Referring to FIG. 6B, each of curves 601 and 602 indicates the distribution of prediction values at which the object is predicted to exist at a predetermined position (a position between P and P' in FIG. 5) in the scene image, similarly to FIG. 6A. The curve 601 indicates the distribution of prediction values concerning the pedestrian 204 shown in FIG. 5. The curve 602 indicates the distribution of prediction values concerning the other vehicle 205 shown in FIG. 5.

In FIG. 6B, a broken-line curve 602B indicates a change in distribution of prediction values when the motion of the other vehicle 205 changes by receiving the influence of the moving loci 501 to 503 (FIG. 5) of the vehicle 1 (self-vehicle). The distribution of the broken-line curve 602B shifts toward a rectangle 604 (the right side on the drawing), as compared to the distribution of the curve 602. The shift of the broken-line curve 602B corresponds to the change from the moving locus 505 to the moving locus 507 of the other vehicle 205 in FIG. 5.

A region between the curve 601 and the broken-line curve 602B is a region where no object exists on the lane on which the vehicle 1 (self-vehicle) travels, and a region where the vehicle 1 (self-vehicle) can travel. The travelable region in FIG. 6B is wider than that in FIG. 6A due to the shift of the broken-line curve 602B. A curve 603B indicates the distribution of traveling patterns by the skilled driver in the travelable region. A peak M2 of the curve 603B indicates a traveling position that is selected by the skilled driver at the highest probability in the travelable region.

The ECU 20 specifies a region (travelable region) where no object exists at each time (for example, t1, t2, t3, . . . , TS) shown in FIG. 7, and calculates, based on the distribution of the traveling patterns by the skilled driver, a moving locus so as to move the vehicle 1 to the position of the peak M2 of the curve 603B. The thus calculated moving locus is set as the moving locus 503 of the vehicle 1 (self-vehicle) obtained in steps S13 and S14 of FIG. 4.

In the second automated driving mode, the moving locus of the vehicle 1 (self-vehicle) is calculated by predicting the motion of the object. The moving locus of the object is corrected by predicting the motion of the object in accordance with the moving locus of the vehicle 1 (self-vehicle). Based on the corrected moving locus of the object, the moving locus of the vehicle 1 (self-vehicle) is corrected. By correcting the moving locus of the vehicle 1 (self-vehicle) based on the change in moving locus of the object by the loop operation, it is possible to calculate the moving locus of the vehicle 1 (self-vehicle) at higher accuracy in the action planning processing.

Therefore, since it is possible to determine the moving locus of the self-vehicle in consideration of the change in moving locus of the object while considering accumulation of traveling data by the skilled driver, it is possible to determine the moving locus of the self-vehicle for the predetermined time at higher accuracy. In addition, since the moving locus is determined based on an action actually taken by the skilled driver, the self-vehicle takes an action that would be selected by the skilled driver or an action close to the action in consideration of the peripheral environment. As a result, even in an environment such as an urban area including many moving objects, it is possible to determine the moving locus of the vehicle 1 (self-vehicle) in accordance with the motions of traffic participants such as a pedestrian and another vehicle.

Third Embodiment: Third Automated Driving Mode

In this embodiment as well, an ECU 20 executes control associated with automated driving of a vehicle 1. The ECU 20 controls automated driving of the vehicle 1 as a control target based on a calculated moving locus. In the third automated driving mode, the moving locus of an object obtained in a scene image at given time T1 is corrected based on an action plan (the moving locus of the vehicle 1 (self-vehicle)) obtained in a scene image at time T0 before time T1, thereby calculating the moving locus of the vehicle 1 (self-vehicle) based on the corrected moving locus of the object. The action plan calculated based on the scene image at time T0 is corrected by an action plan calculated based on the scene image at time T1. That is, the moving locus of the vehicle 1 (self-vehicle) calculated at time T0 is replaced by the moving locus of the vehicle 1 (self-vehicle) calculated at time T1.

FIG. 2C is a view showing an outline of a processing sequence corresponding to the third automated driving mode. Processing at time T0 is the same as the processing shown in FIG. 2A, in which the ECU 20 performs scene understanding, prediction, and action planning processes by one sequence. The calculation result of the action plan (the moving locus of the vehicle 1 (self-vehicle)) calculated at time T0 is reflected on processing at time T1.

In the processing at time T1, scene understanding, prediction, and action planning processes are performed by one sequence. In the prediction processing, however, the calculation result of the action plan at time T0 before time T1 is input.

The ECU 20 corrects the moving locus of the object calculated based on the scene image acquired at time T1 using the action plan calculated at time T0, thereby time-serially calculating the moving locus of the vehicle 1 (self-vehicle) corresponding to the corrected moving locus of the object. The calculation result of the action plan (the moving locus of the vehicle 1 (self-vehicle)) calculated at time T1 is reflected on processing at time T2 in the same manner.

Figure 9:
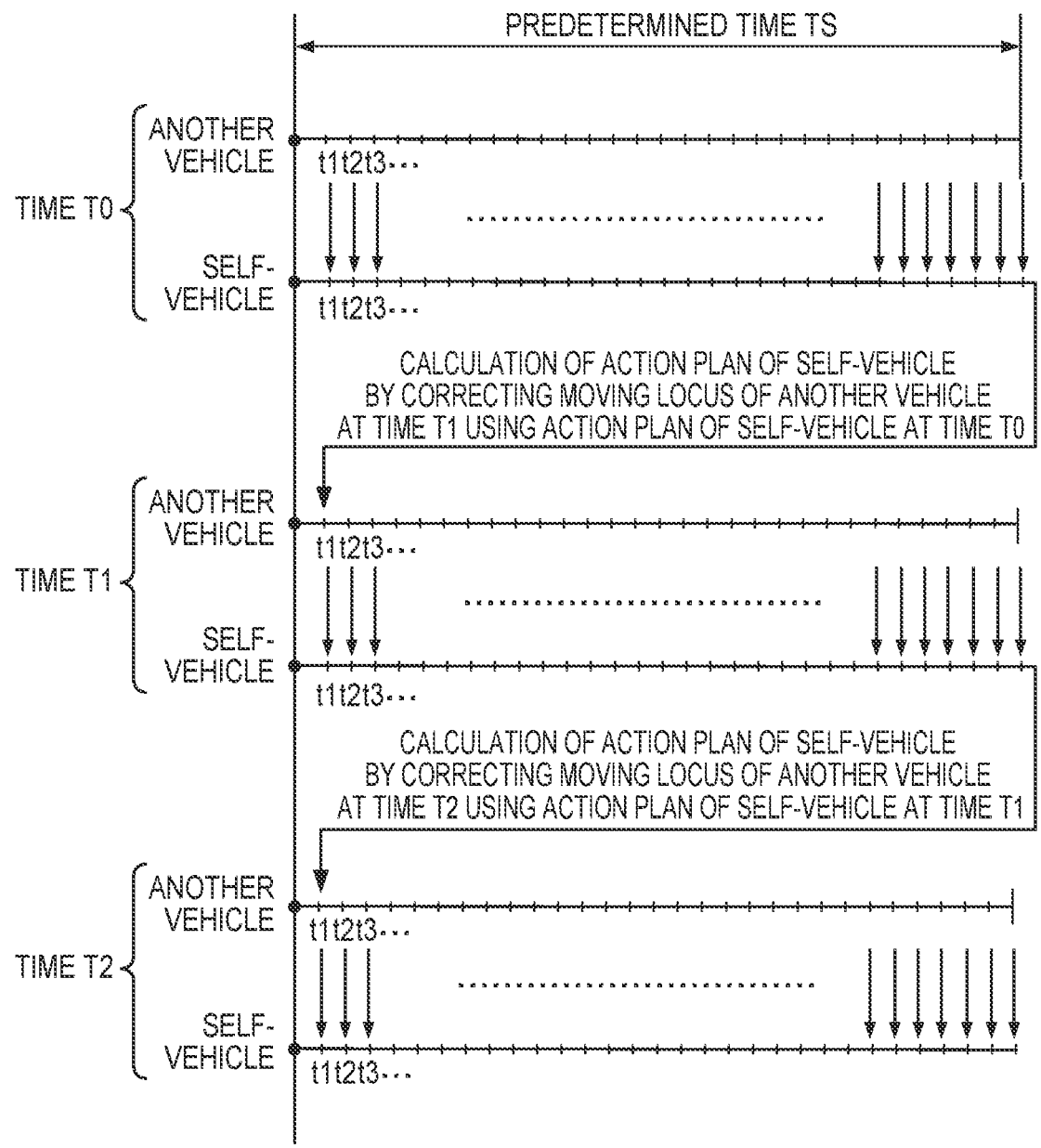
FIG. 9 is a view schematically showing the relationship between a time axis (ordinate) when a self-vehicle travels and a time axis (abscissa) used for calculation when obtaining a moving locus.

FIG. 9 is a view schematically showing the relationship between a time axis (ordinate) representing actual time when the vehicle 1 (self-vehicle) travels and a calculation time axis (abscissa) to be used for calculation when obtaining the moving loci of a dynamic object (moving object) and the vehicle 1 (self-vehicle). For example, at time T1, based on information (external information) acquired by detection units (camera 41, lidar 42, and radar 43), pieces of information of a static object and dynamic object existing around the vehicle 1 (self-vehicle) are obtained as an image representing the peripheral status of the vehicle (a scene image representing one scene), as shown in, for example, FIG. 11.

In the third automated driving mode, the ECU 20 time-serially calculates the moving locus of the object for a predetermined time TS from time (for example, time T1) when the scene image is acquired, and time-serially calculates the moving locus of the vehicle 1 (self-vehicle) based on the position of the moving locus of the object at each time.

The ECU 20 predicts the moving locus along which the dynamic object such as a pedestrian or another vehicle that moves with the lapse of time moves for the predetermined time TS from time T1 when the scene image is acquired. In the prediction processing, the calculation result of the action plan (the moving locus of the vehicle 1 (self-vehicle)) obtained in the scene image at time T0 before time T1 is input.

The moving locus of the object is predicted by time-serially predicting the position of the object for the predetermined time TS at each time t1, t2, t3, . . . obtained by dividing the predetermined time TS.

The ECU 20 corrects the prediction result of the moving locus of the object based on the calculation result of the action plan (the moving locus of the vehicle 1 (self-vehicle)) obtained in the scene image at time T0. The ECU 20 time-serially calculates the moving locus of the vehicle 1 (self-vehicle) for the predetermined time TS at each time t1, t2, t3, . . . based on the corrected moving locus of the object.

Based on the calculation result of the moving locus of the vehicle 1 (self-vehicle) calculated at time T1, the ECU 20 corrects (updates) the moving locus of the vehicle 1 (self-vehicle) calculated at time T0. The ECU 20 reflects the calculation result of the action plan (the moving locus of the vehicle 1 (self-vehicle)) calculated at time T1 on the processing at time T2 in the same manner.

Figure 10:
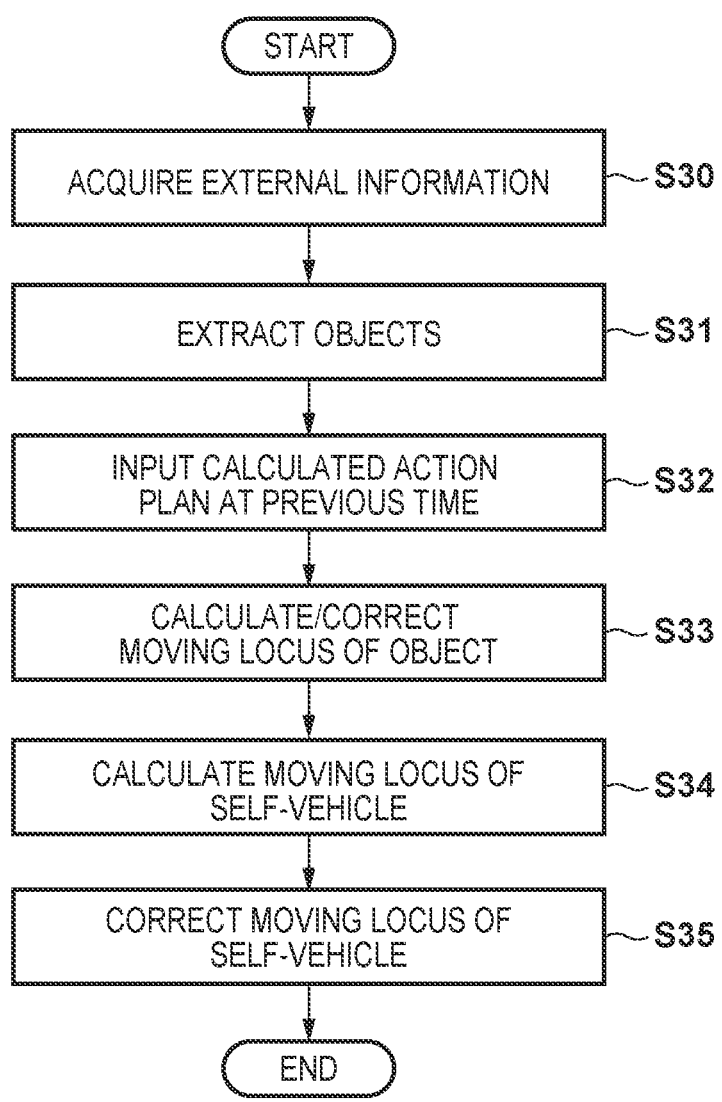
FIG. 10 is a flowchart for explaining the procedure of processing in the third automated driving mode.

FIG. 10 is a flowchart for explaining the procedure of processing in the third automated driving mode. When, for example, a driver instructs setting of a destination and automated driving, the ECU 20 automatically controls traveling of the vehicle 1 to the destination in accordance with a guidance route found by an ECU 24.

Figure 11:
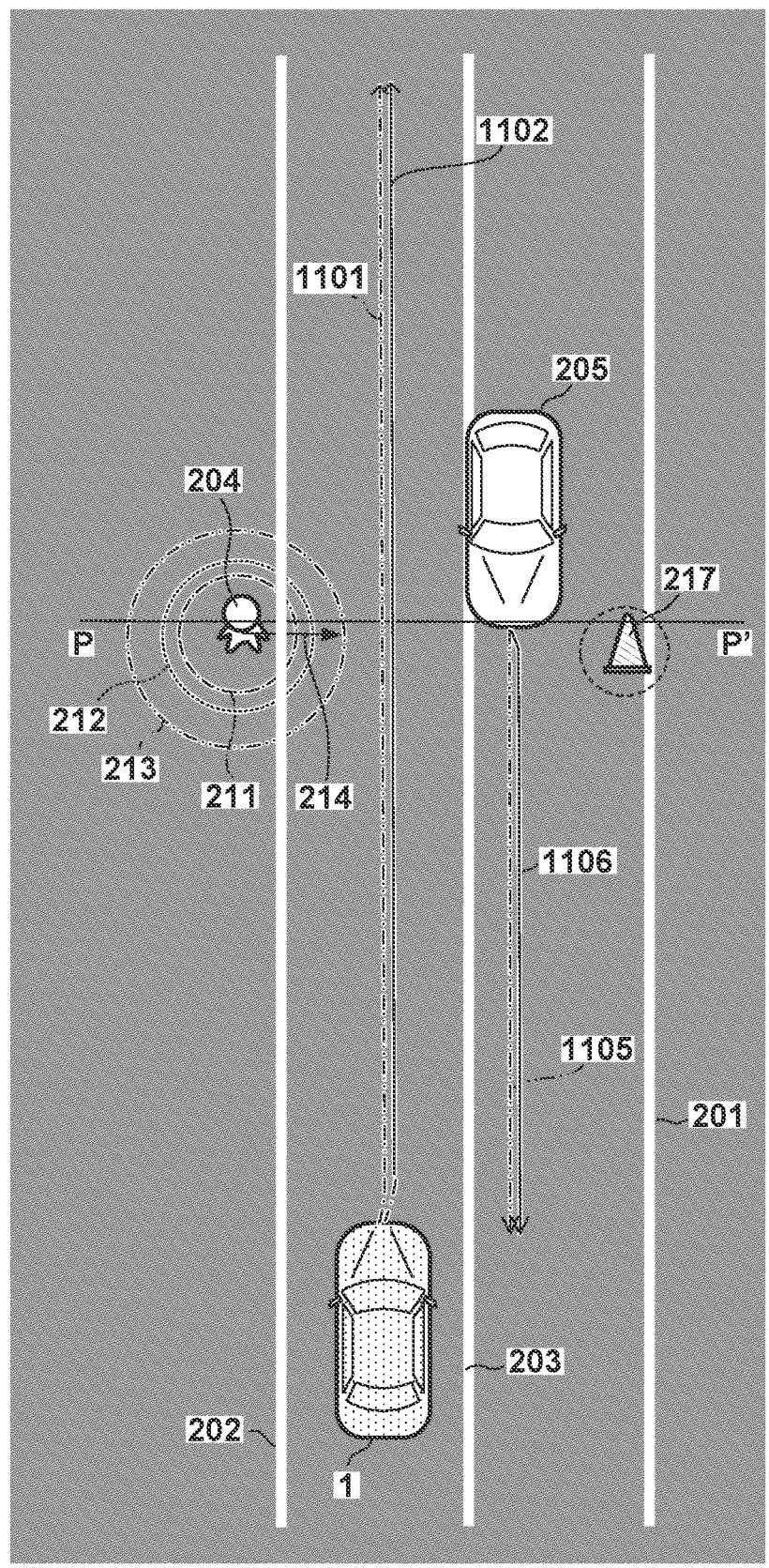
FIG. 11 is a view exemplifying a scene image obtained at given time.

At the time of automated driving control, the ECU 20 acquires information (external information) concerning the peripheral status of the vehicle 1 from ECUs 22 and 23 (step S30). By performing the processing in step S30, a scene image shown in, for example, FIG. 11 is acquired based on the external information at time T1.

The ECU 20 extracts objects included in the scene image at time (for example, time T1) when the external information is acquired (step S31). The ECU 20 extracts, from the scene image, a static object (stationary object) that does not move with the lapse of time, and a dynamic object (moving object) that moves with the lapse of time, and specifies the arrangement of the extracted objects in the scene image. The ECU 20 fixes the position of the vehicle 1 (self-vehicle) in the scene image as the origin of a coordinate system, specifying the positions of the objects.

The ECU 20 inputs the calculated action plan (the calculation result of the moving locus of the self-vehicle) at previous time T0 (step S32). That is, the ECU 20 acquires the action plan (the moving locus of the self-vehicle) obtained in the previous scene image at time T0 before time T1 when the scene image is acquired.

With respect to the dynamic object (moving object) among the extracted objects, the ECU 20 time-serially calculates the motion (moving locus) of the object for the predetermined time TS from time T1, when the external information is acquired, toward the future (step S33).

The ECU 20 corrects the moving locus of the object calculated in step S33 based on the action plan (the moving locus of the self-vehicle) obtained in the previous scene image at time T0 and acquired in step S32. Based on the moving locus of the vehicle 1 calculated in the previous scene image acquired at time (for example, T0) before time (for example, T1) when the scene image is acquired, the ECU 20 calculates the moving locus by correcting the moving locus of the object in the scene image. The motion of the vehicle 1 (self-vehicle) may influence the motion of the object, and the ECU 20 calculates a change in motion of the object (moving locus of the object) caused by the influence of the moving locus of the vehicle 1 (self-vehicle), and corrects the moving locus of the object based on the calculation result of the change in moving locus. The ECU 20 time-serially corrects the moving locus of the object for the predetermined time TS at each time t1, t2, t3, . . . obtained by dividing the predetermined time TS.

In step S34, the ECU 20 time-serially calculates the moving locus of the vehicle 1 (self-vehicle) for the predetermined time based on the corrected moving locus of the object. The ECU 20 time-serially calculates the moving locus of the vehicle 1 (self-vehicle) for the predetermined time TS at each time t1, t2, t3, . . . obtained by dividing the predetermined time TS based on the corrected moving locus of the object in consideration of, for example, traveling data by a skilled driver and the position of the object existing around the vehicle 1 (self-vehicle) in the scene image.

In step S35, based on the calculation result in step S34, the ECU 20 corrects (updates) the action plan (the moving locus of the vehicle 1 (self-vehicle)) calculated at time T0.

Detailed contents of the processing in the third automated driving mode will be described next with reference to FIG. 11. At time T1, a scene image of objects existing around the traveling vehicle 1 (self-vehicle), that has been acquired by the detection units (camera 41, lidar 42, and radar 43), is acquired (FIG. 11). The objects (a pedestrian 204, another vehicle 205, and an obstacle 217) in FIG. 11 are the same as in FIG. 5.

The ECU 20 extracts the objects (the pedestrian 204, the other vehicle 205, and the obstacle 217) included in the scene image shown in FIG. 11 by the scene understanding processing, fixes the position of the vehicle 1 (self-vehicle) in the scene image as the origin of a coordinate system, and thus specifies the positions of the objects. The above processing corresponds to steps S30 and S31 of FIG. 10.

Referring to FIG. 11, a moving locus 1101 indicated by a two-dot dashed line represents the action plan (the moving locus of the vehicle 1 (self-vehicle)) calculated based on the scene image at time T0 before time T1. By performing the series of scene understanding, prediction, and action planning processes by one sequence, similarly to the processes explained in the first embodiment, it is possible to obtain the moving locus 1101 of the vehicle 1 (self-vehicle). This processing corresponds to step S32 of FIG. 10, in which the ECU 20 acquires the calculated action plan (the calculation result of the moving locus of the self-vehicle) at previous time T0. This processing corresponds to step S32 of FIG. 10.

A moving locus 1105 indicated by a two-dot dashed line represents the prediction result of the calculated moving locus of the other vehicle 205 in the scene image at time T1. The ECU 20 calculates a change in moving locus of the other vehicle 205 when the vehicle 1 (self-vehicle) moves along the moving locus 1101. The ECU 20 corrects the moving locus of the other vehicle 205 based on the calculation result of the change in moving locus. Referring to FIG. 11, a moving locus 1106 indicated by a solid line represents the corrected moving locus of the other vehicle 205. Based on the moving locus (for example, 1101) of the vehicle calculated in the previous scene image acquired at previous time (for example, T0) before time (for example, T1) when the scene image is acquired, the ECU 20 calculates the moving locus (for example, 1106) by correcting the moving locus (for example, 1105) of the object in the scene image. The processing of obtaining the moving loci 1105 and 1106 of the other vehicle 205 corresponds to step S33 of FIG. 10.

Next, the ECU 20 time-serially calculates the moving locus of the vehicle 1 (self-vehicle) for the predetermined time based on the corrected moving locus 1106 of the other vehicle 205. Referring to FIG. 11, a moving locus 1102 indicated by a solid line represents the moving locus of the vehicle 1 (self-vehicle) calculated based on the corrected moving locus 1106 of the other vehicle 205. The processing of obtaining the moving locus 1102 corresponds to step S34 of FIG. 10.

Based on the calculated moving locus 1102 of the vehicle 1 (self-vehicle), the ECU 20 corrects the action plan (the moving locus 1101 of the vehicle 1 (self-vehicle)) calculated at time T0. The processing of correcting the moving locus 1101 by the moving locus 1102 corresponds to step S35 of FIG. 10.

FIGS. 6A to 6C are views each exemplarily showing determination of the moving locus of the self-vehicle. Referring to FIG. 6C, each of curves 601 and 602 indicates the distribution of prediction values at which the object is predicted to exist at a predetermined position (a position between P and P' in FIG. 11) in the scene image. The curve 601 indicates the distribution of prediction values concerning the pedestrian 204 shown in FIG. 11. The curve 602 indicates the distribution of prediction values concerning the other vehicle 205 shown in FIG. 11.

In FIG. 6C, a broken-line curve 602C indicates a change in distribution of prediction values when the motion of the other vehicle 205 changes by receiving the influence of the moving locus 1101 (FIG. 11) of the vehicle 1 (self-vehicle). The distribution of the broken-line curve 602C shifts toward a rectangle 604 (the right side on the drawing), as compared to the distribution of the curve 602. The shift of the broken-line curve 602C corresponds to the change from the moving locus 1105 to the moving locus 1106 of the other vehicle 205 in FIG. 11.

A region between the curve 601 and the broken-line curve 602C is a region where no object exists on the lane on which the vehicle 1 (self-vehicle) travels, and a region where the vehicle 1 (self-vehicle) can travel. The travelable region in FIG. 6C is wider than, for example, the travelable region in FIG. 6A due to the shift of the broken-line curve 602C. A curve 603C indicates the distribution of traveling patterns by the skilled driver in the travelable region. A peak M3 of the curve 603C indicates a traveling position that is selected by the skilled driver at the highest probability in the travelable region. A curve 603 indicates the distribution traveling patterns by the skilled driver in the scene image at time T0, and corresponds to the curve 603 shown in FIG. 6A.

The ECU 20 specifies a region (travelable region) where no object exists at each time (for example, t1, t2, t3, . . . , TS) shown in FIG. 9, and calculates, based on the distribution of the traveling patterns by the skilled driver, a moving locus so as to move the vehicle 1 to the position of the peak M3 of the curve 603C. The thus calculated moving locus is set as the moving locus 1102 of the vehicle 1 (self-vehicle) obtained in step S34 of FIG. 10. In FIG. 6C, a position M1 is on the moving locus of the vehicle 1 calculated based on the scene image at time T0, and is corrected to M3 by correcting the moving locus of the vehicle 1 (self-vehicle).

In the third automated driving mode, the moving locus of the object existing around the vehicle 1 in the scene image acquired at time T1 is corrected based on the calculation result of the action plan (the moving locus of the vehicle 1 (self-vehicle)) calculated at previous time T0. It is possible to reduce the load of the operation processing by correcting the moving locus of the object based on the moving locus of the vehicle calculated in the previous scene image acquired at time before time when the scene image is acquired. This makes it possible to correct the moving locus of the object while reducing the calculation load, as compared to the loop operation of repeating the prediction and action planning processes, and time-serially calculate the moving locus of the vehicle 1 (self-vehicle) based on the corrected moving locus of the object.

Other Embodiments

Several preferred embodiments have been described above. However, the present invention is not limited to these examples and may partially be modified without departing from the scope of the invention. For example, another element may be combined with the contents of each embodiment in accordance with the object, application purpose, and the like. Part of the contents of a certain embodiment may be combined with the contents of another embodiment. In addition, individual terms described in this specification are merely used for the purpose of explaining the present invention, and the present invention is not limited to the strict meanings of the terms and can also incorporate their equivalents.

Furthermore, a program that implements at least one function described in each embodiment is supplied to a system or an apparatus via a network or a storage medium, and at least one processor in the computer of the system or the apparatus can read out and execute the program. The present invention can be implemented by this form as well.

Summary of Embodiments

Arrangement 1. A vehicle control apparatus according to the above embodiments is a vehicle control apparatus (for example, 100) that controls automated driving of a vehicle (for example, 1) based on a generated moving locus, comprising:

an extraction unit (for example, 20, 22, 23) configured to extract an object (for example, 204, 205) existing around the vehicle (1) from a scene image (for example, FIG. 5) representing a peripheral status of the vehicle (1); and a control unit (for example, 20) configured to calculate a moving locus (for example, 505) of the object and a moving locus (for example, 501) of the vehicle for a predetermined time (for example, TS) from time (for example, T0) when the scene image is acquired, and generate a moving locus (for example, 506, 507) by correcting the moving locus of the object based on the moving locus (501) of the vehicle.

According to arrangement 1, it is possible to obtain the moving locus of the object by correcting a predicted motion based on the moving locus of the vehicle as a control target.

Arrangement 2. In the vehicle control apparatus (100) according to the above embodiment, the control unit (20) generates a moving locus (for example, 502, 503) by correcting the moving locus of the vehicle based on the corrected moving locus (506, 507) of the object.

According to arrangement 2, it is possible to obtain the corrected moving locus of the vehicle based on the corrected moving locus of the object.

Arrangement 3. In the vehicle control apparatus (100) according to the above embodiment, the control unit (20) performs repetitive operations for the calculation of the moving locus and the correction of the moving locus in a predetermined period.

Arrangement 4. In the vehicle control apparatus (100) according to the above embodiment, the control unit (20) determines, based on comparison with a threshold, whether a change in the corrected moving locus of the object has converged by the repetitive operations in the period.

Arrangement 5. In the vehicle control apparatus (100) according to the above embodiment, if, based on the determination, the change in the corrected moving locus of the object has converged, the control unit (20) generates the moving locus (for example, 503 in FIG. 5) by correcting the moving locus of the vehicle based on the converged moving locus (for example, 507 in FIG. 5) of the object.

Arrangement 6. In the vehicle control apparatus (100) according to the above embodiment, if, based on the determination, the change in the corrected moving locus of the object has not converged in the period, the control unit (20) generates the moving locus of the vehicle based on a last corrected moving locus of the object.

According to arrangements 3 to 6, it is possible to calculate the moving locus of the object and that of the vehicle 1 at high accuracy by performing the repetitive operation in the predetermined period.

Arrangement 7. In the vehicle control apparatus (100) according to the above embodiment, by performing image processing for the scene image, the extraction unit (20, 22, 23) extracts, from the scene image, a static object (for example, 217 in FIG. 5) that does not move with a lapse of time and a dynamic object (for example, 205 in FIG. 5) that moves with the lapse of time.

According to arrangement 7, it is possible to specify, among the objects included in the scene image, an object whose moving locus is to be obtained.

Arrangement 8. In the vehicle control apparatus (100) according to the above embodiment, the control unit (20) executes operation processing by fixing a position of the vehicle in the scene image as an origin of a coordinate system.

According to arrangement 8, it is possible to reduce the load of the operation processing in the calculation of the moving locus by fixing, as the origin of the coordinate system, the position of the vehicle as the control target in the image acquired at given time.

Arrangement 9. A vehicle (for example, 1) according to the above embodiment comprises a vehicle control apparatus (for example, 100) defined in any one of arrangements 1 to 8 described above.

According to arrangement 9, it is possible to control automated driving of the vehicle based on the moving locus generated at higher accuracy, by executing the above-described processing in the vehicle quickly.

Arrangement 10. A vehicle control method according to the above embodiments is a vehicle control method for a vehicle control apparatus that controls automated driving of a vehicle based on a generated moving locus, comprising:

an extraction step (for example, S20, S21) of extracting an object existing around the vehicle from a scene image (for example, FIG. 5) representing a peripheral status of the vehicle; and a control step (for example, S22-S24) of performing operations for calculating a moving locus (for example, 505) of the object and a moving locus (for example, 501) of the vehicle for a predetermined time (for example, TS) from time (for example, T0) when the scene image is acquired, and generating a moving locus (for example, 506, 507) by correcting the moving locus of the object based on the moving locus (501) of the vehicle.

According to arrangement 10, it is possible to obtain the moving locus of the object by correcting a predicted motion based on the moving locus of the self-vehicle.

Arrangement 11. In the vehicle control method according to the above embodiments, in the control step (for example, S22-S24), a moving locus (for example, 502, 503) is generated by correcting the moving locus of the vehicle based on the corrected moving locus (506, 507) of the object.

According to arrangement 11, it is possible to obtain the corrected moving locus of the vehicle based on the corrected moving locus of the object.

Arrangement 12. In the vehicle control method according to the above embodiments, in the control step (for example, S22-S24), the operations for the calculation of the moving locus and the correction of the moving locus are performed in a predetermined period.

According to arrangement 12, it is possible to calculate the moving locus of the object and that of the vehicle 1 at high accuracy by performing the repetitive operation in the predetermined period.

Arrangement 13. A storage medium according to the above embodiments stores a program for causing a computer to execute each step of a vehicle control method defined in any one of arrangements 10 to 12 described above. According to arrangement 13, it is possible to implement each step of the vehicle control method by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-166064, filed Aug. 30, 2017, which is hereby incorporated by reference wherein in its entirety.

What is claimed is:

1. A vehicle control apparatus that controls automated driving of a vehicle based on a generated moving locus, comprising:
    at least one processor; and
    at least one memory storing instructions that, when executed by the at least one processor, cause the at least one processor to function as:
    an extraction unit configured to extract an object existing around the vehicle from a scene image representing a peripheral status of the vehicle; and
a control unit configured to calculate a moving locus of the object and a moving locus of the vehicle for a predetermined time from time when the scene image is acquired, and generate a moving locus of the object corrected by predicting a change of the moving locus of the object caused by a movement of the vehicle along the moving locus of the vehicle,
    wherein in a case where the extraction unit extracts the object and another object from the scene image,
    the control unit calculates moving loci at each time corresponding to the object and the another object, and specifies a travelable region where no object exists between the moving loci at each time, and generates the moving locus of the vehicle based on a traveling position to be selected by a skilled driver at a higher probability in the travelable region.

2. The apparatus according to claim 1, wherein the control unit generates a moving locus by correcting the moving locus of the vehicle based on the corrected moving locus of the object.

3. The apparatus according to claim 1, wherein the control unit performs repetitive operations for the calculation of the moving locus and the correction of the moving locus in a predetermined period.

4. The apparatus according to claim 3, wherein the control unit determines, based on comparison with a threshold, whether a change in the corrected moving locus of the object has converged by the repetitive operations in the period.

5. The apparatus according to claim 4, wherein if, based on the determination, the change in the corrected moving locus of the object has converged, the control unit generates the moving locus by correcting the moving locus of the vehicle based on the converged moving locus of the object.

6. The apparatus according to claim 4, wherein if, based on the determination, the change in the corrected moving locus of the object has not converged in the period, the control unit generates the moving locus of the vehicle based on a last corrected moving locus of the object.

7. The apparatus according to claim 1, wherein by performing image processing for the scene image, the extraction unit extracts, from the scene image, a static object that does not move with a lapse of time and a dynamic object that moves with the lapse of time.

8. The apparatus according to claim 1, wherein the control unit executes operation processing by fixing a position of the vehicle in the scene image as an origin of a coordinate system.

9. A vehicle comprising a vehicle control apparatus defined in claim 1.

10. A vehicle control method for a vehicle control apparatus that controls automated driving of a vehicle based on a generated moving locus, comprising:
    an extraction step of extracting an object existing around the vehicle from a scene image representing a peripheral status of the vehicle; and
a control step of performing operations for calculating a moving locus of the object and a moving locus of the vehicle for a predetermined time from time when the scene image is acquired, and generating a moving locus of the object corrected by predicting a change of the moving locus of the object caused by a movement of the vehicle along the moving locus of the vehicle,
    wherein in a case where the object and another object are extracted in the extraction step from the scene image,
    in the control step, moving loci at each time corresponding to the object and the another object are calculated, and a travelable region where no object exists between the moving loci at each time is specified, and the moving locus of the vehicle based on a traveling position to be selected by a skilled driver at a higher probability in the travelable region is generated.

11. The method according to claim 10, wherein in the control step, a moving locus is generated by correcting the moving locus of the vehicle based on the corrected moving locus of the object.

12. The method according to claim 10, wherein in the control step, the operations for the calculation of the moving locus and the correction of the moving locus are performed in a predetermined period.

13. A storage medium storing a program for causing a computer to execute each step of a vehicle control method defined in claim 10.

14. A vehicle control apparatus that controls automated driving of a vehicle based on a generated moving locus, comprising:
    at least one processor; and
    at least one memory storing instructions that, when executed by the at least one processor, cause the at least one processor to function as:
    an extraction unit configured to extract an object existing around the vehicle from a scene image representing a peripheral status of the vehicle; and
    a control unit configured to calculate a moving locus of the object and a moving locus of the vehicle for a predetermined time from time when the scene image is acquired, and generate a moving locus of the object corrected by predicting a change of the moving locus of the object caused by a movement of the vehicle along the moving locus of the vehicle,
    wherein the control unit performs repetitive operations for the calculation of the moving locus and the correction of the moving locus in a predetermined period, and
    wherein the control unit determines, based on comparison with a threshold, whether a change in the corrected moving locus of the object has converged by the repetitive operations in the period,
    wherein in a case where the extraction unit extracts the object and another object from the scene image,
    the control unit calculates moving loci at each time corresponding to the object and the another object, and specifies a travelable region where no object exists between the moving loci at each time, and generates the moving locus of the vehicle based on a traveling position to be selected by a skilled driver at a higher probability in the travelable region.

* * * * *